United States Patent
Rohde et al.

(10) Patent No.: US 8,726,254 B2
(45) Date of Patent: May 13, 2014

(54) EMBEDDED ANNOTATION AND PROGRAM ANALYSIS

(75) Inventors: Henning Korsholm Rohde, Renton, WA (US); Avi Samuel Gavlovski, Kirkland, WA (US); Bala Neerumalla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 12/507,869

(22) Filed: Jul. 23, 2009

(65) Prior Publication Data

US 2010/0325620 A1 Dec. 23, 2010

Related U.S. Application Data

(60) Provisional application No. 61/218,926, filed on Jun. 20, 2009.

(51) Int. Cl.
*G06F 9/45* (2006.01)

(52) U.S. Cl.
USPC .......................................................... 717/154

(58) Field of Classification Search
None
See application file for complete search history.

(56) References Cited

U.S. PATENT DOCUMENTS

| | | | |
|---|---|---|---|
| 7,207,065 B2 | 4/2007 | Chess et al. | |
| 7,231,633 B2 * | 6/2007 | Grassens | 717/124 |
| 7,392,545 B1 | 6/2008 | Weber et al. | |
| 7,437,718 B2 | 10/2008 | Fournet et al. | |
| 7,596,783 B2 * | 9/2009 | Huang et al. | 717/146 |
| 2006/0212941 A1 * | 9/2006 | Bronnikov et al. | 726/24 |
| 2008/0184208 A1 | 7/2008 | Sreedhar et al. | |

OTHER PUBLICATIONS

"CodeSecure", retrieved at <<http://www.armorize.com/?link_id=codesecure>>, Jun. 17, 2009, pp. 3.
"Ounce Labs Achieves Breakthroughs in Source Code Vulnerability Analysis", retrieved at <<http://www.ouncelabs.com/about/news/292-ounce_labs_achieves_breakthroughs_in_source_code_vulnerability_analysis>>, Dec. 12, 2005, pp. 3.
"CQUAL: A Tool for Adding Type Qualifiers to C", retrieved at <<http://www.cs.umd.edu/~jfoster/cqual/>>, Jun. 17, 2009, pp. 5.
Cook, et al., "Securing Legacy C Applications Using Dynamic Data Flow Analysis", retrieved at <<http://www.stsc.hill.af.mil/crosstalk/2008/09/0809CookLinChang.html>>, Sep. 2008, pp. 9.
"Security Enhancements in Windows Vista", retrieved at <<http://download.microsoft.com/download/8/1/2/8120652c-9abe-4dd4-b295-dcf69e770a87/WindowsVistaSecurity.doc>>, May 2007, pp. 19.
Das, et al., "ESP: PathSensitive Program Verification in Polynomial Time", PLDI'02, Jun. 17-19, 2002, pp. 12.

(Continued)

*Primary Examiner* — Henry Tsai
*Assistant Examiner* — Juanito Borromeo
(74) *Attorney, Agent, or Firm* — Nicholas Chen; Kate Drakos; Micky Minhas

(57) ABSTRACT

Program source code is annotated to support dataflow analysis or other program analysis, without requiring changes to compilers. Annotation statements are embedded inside comments or other non-code-generative portions of the source code. The annotations can be used to express contracts at routine boundaries, allowing an analyzer to check the global correctness of the source code through modular (local) analysis, with performance that is linear in the number of routines. In particular, annotated SQL source code may be analyzed to identify SQL injection vulnerabilities.

20 Claims, 4 Drawing Sheets

(56) References Cited

OTHER PUBLICATIONS

"Statements Overview", Retrieved from <<http://msdn.microsoft.com/en-us/library/865x40k4(v=vs.71).aspx>>, copyright date 2012, 2 pages.

"NTOUCH® 4GL A Guide to the INTOUCH Language", Retrieved from <<http://www.ttinet.com/doc/language_v44_005.html>>, no later than Nov. 30, 2012, 13 pages.

"Chapter 3: Smalltalk Statements", Retrieved from <<http://www.inf.ufsc.br/poo/smalltalk/ibm/tutorial/chap3.html#3.30>>, copyright 1995 on <<http://www.inf.ufsc.br/poo/smalltalk/ibm/index.html>>, 9 pages.

"Flashcard sets with a 'comments' term meaning 'text within source code that is ignored by the compiler and is used to make notes about the workings of the class.'", Retrieved from <<http://quizlet.com/ . . . >>, copyright date 2012, 1 page.

"An Introduction C++ Statements", Retrieved from <<http://www.bernstein-plus-sons.com/.dowling/CSC077/Statements.html>>, copyright date 1999, 3 pages.

"IBM Informix Guide to SQL: Syntax: How to Enter SQL Comments", Retrieved from <<http://publib.boulder.ibm.com/infocenter/idshelp/v111/index.jsp?topic=/com.ibm.sqls.doc/sqls29.htm>>, Oct. 16, 2007, 3 pages.

\* cited by examiner

EMBEDDED ANNOTATION AND PROGRAM ANALYSIS

RELATED APPLICATIONS

The present application claims priority to, and incorporates by reference, U.S. provisional patent application No. 61/218,926 filed Jun. 20, 2009.

BACKGROUND

SQL (Structured Query Language) and its various implementations are widely used database technology. Transact-SQL (TSQL) is an extension of SQL which provides flow control, local variables, and additional support functions; except as otherwise expressly indicated, references herein to SQL also include TSQL. SQL injection is a potentially malicious activity which exploits website and other external-facing interface security vulnerabilities by violating assumptions about user-provided input. A SQL injection vulnerability exists when user-supplied data is directly used in the construction of a dynamic SQL statement, or when user input is stored in a database using one web page and then retrieved from the database and used to construct dynamic SQL statements in a different web page, for example. In each case, a malicious attacker can inject SQL commands into the SQL statement and misuse the database and in turn the website, using those injected commands, e.g., compromise the backend database using those injected commands.

Techniques for reducing or preventing SQL injection vary. For example, web server and database logs may be scrutinized to check for anomalous queries or unusual accesses. Permissions may be limited to the minimum needed, rather than granting users administrative privileges. Code for a given website may also be reviewed for vulnerabilities, and modified as needed to validate user input, to use parameterized queries, and to use escapes and delimiters to reduce injection opportunities. Code review may be manual, automated, or a combination of manual and automated review.

In some approaches, an automated program analysis (not necessarily for SQL injection) is performed using annotations of the program by a developer, while in other approaches, no annotation is used. However, some known program annotation approaches require integration of the annotations into the compiler, so that placing annotations in a program's source code does not prevent compilation of the source code.

SUMMARY

Some embodiments discussed herein support analytic annotation of a program source code without requiring integration of the annotations into the compiler or interpreter. Annotation statements that support dataflow analysis are embedded in comments or other portions of source code that do not generate instructions when compiled. A dataflow analyzer locates the annotation statements, and interprets them. In some embodiments, the dataflow analyzer checks the annotated source code for injection vulnerability and issues warning messages based on dataflow analysis of the annotation statements and the program source code for SQL injection and/or TSQL injection vulnerabilities. For example, the dataflow analyzer may report that data is read from an object or from a backend server without any detectable input validation by the program source code. More generally, some embodiments operate consistent with the examples in the Figures, with the exemplary claims, and/or with the examples in the specification text.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
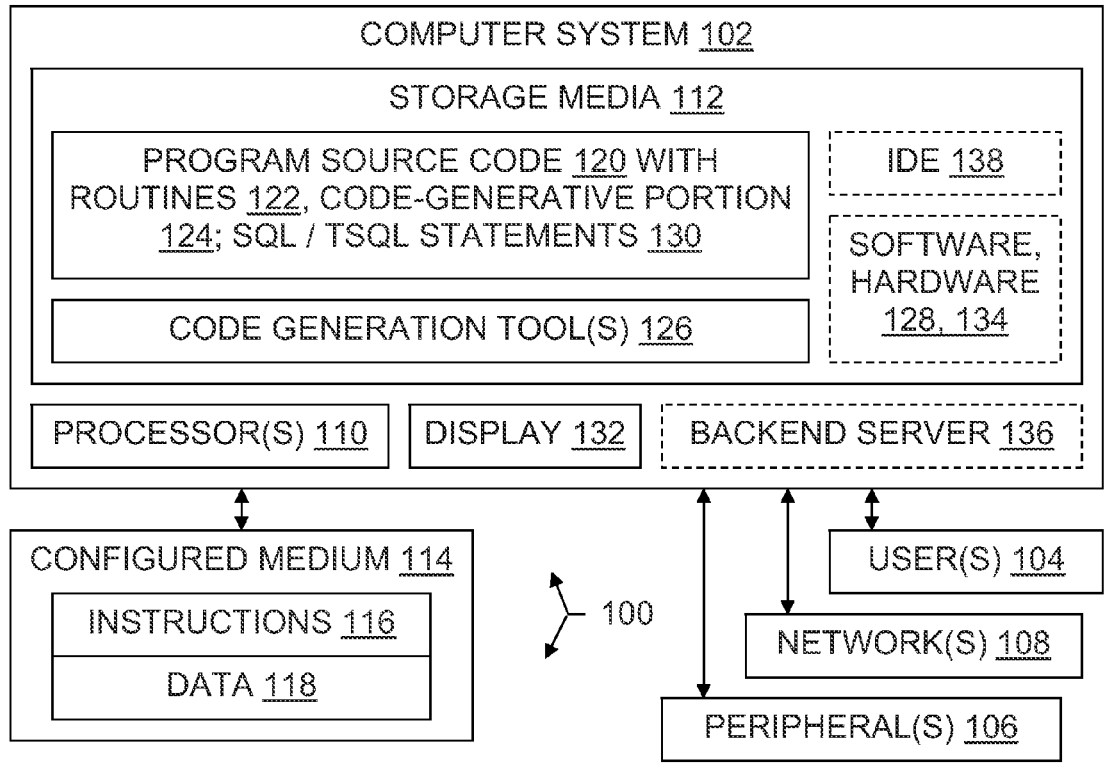
FIG. 1 is a block diagram illustrating a computer system having at least one processor, at least one memory, a source for a program which uses SQL statements, and other items in an operating environment which may be present on multiple network nodes, and also illustrating configured storage medium embodiments.

SQL injection poses a major security problem. Mass SQL injection attacks during 2008 reflected the prevalence of SQL injection vulnerabilities across thousands of web sites. Advancements in search engine usage provided an easy way for attackers to detect interesting web URLs and mount SQL Injection attacks on a mass scale. Although some black box tools exist to find SQL injections in ASP and TSQL code, dataflow analysis tools that can detect these vulnerabilities by analyzing the source code have been lacking or inadequate. One obstacle for modular global analysis is that the vulnerable languages do not allow metadata (such as custom attributes in C#), so it is not possible to annotate them in-source without changing the language/standard.

Some embodiments described herein provide a path-sensitive, scalable and modular dataflow analysis toolset capable of finding defects in annotated source code, including TSQL and VBScript/ASP (Microsoft® Active Server Pages) procedures. Some embodiments are applicable to any language with comments or other non-code-generative portions in which annotations can be embedded. The source code is annotated with non-breaking contract specifications (and defect suppressions) that allow an embodiment to perform analysis that is scalable. In particular, analysis can be performed (but is not restricted to) SQL injection detection. The annotations express contracts at procedure boundaries, thus allowing an embodiment to check the global correctness of source code through modular (local) analysis, yielding performance that is linear in the number of procedures (~roughly the size of the source code).

Some embodiments provide path-sensitive scalable, modular dataflow analysis of languages with comments, notably TSQL and VBScript/ASP. Some provide in-source non-breaking annotation support for languages with comments, notably TSQL and VBScript/ASP. Some provide path-sensitive scalable, modular dataflow analysis of TSQL and VBScript/ASP procedures for SQL Injection vulnerabilities.

Precise (path-sensitive) global dataflow analysis is computationally expensive, as it requires analyzing execution paths that cross function boundaries, and call stacks that are arbitrarily (and even infinitely) deep. Traditional modular (local) dataflow analysis is fast, but can only verify correctness of each function in isolation; it cannot check global correctness of an entire application. For languages with metadata, such as custom attributes or _declspecs, one can obtain such global correctness through the means of annotations. However, for languages without metadata, there has been no such option.

Some solutions described herein augment the source code with annotations (and suppressions) embedded in comments. The annotations express the preconditions and postconditions that an application program interface (API) must satisfy, and can thus be used to verify not only the correctness of that API (the callee) but also the correctness of all callers of that API, in a way that is also efficient. The analysis is modular (and thus the runtime is linear in number of procedures (~roughly the size of the source code)), and it can check global correctness thanks to the annotations, unlike other local analysis tools.

Some embodiments provide and/or utilize an annotation language that can be embedded anywhere in the source code text, usually but not necessarily comments. The annotation language is non-breaking for existing tools such as parsers and compilers. The embedded language is an imperative language featuring annotation and suppression statements, conditionals, include files, and macros, all of which are agnostic with regard to the source languages, via a (customizable) preamble that comes before an annotated statement. The language also has an 'attach' statement for allowing annotations to be applied to any named procedure or other routine, even though that routine is textually not with the source file as a definition or declaration; this differs from the requirement for custom attributes or _declspecs, for example.

Some embodiments are directed to the area of SQL injection analysis for TSQL and VBScript/ASP source code ("SQL Injection" is the term used for these vulnerabilities irrespective of the source language). SQL injection is a persistent and widespread security problem in database-backed applications, as shown by massive attacks in 2008 affecting over a half-million websites. The tools can also analyze source code with no or few annotations, but they tend to produce more accurate and complete results after the code has been annotated. Thus the annotation work itself can be an iterative process of refining the tool's output, especially as source code evolves over time.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Routine" means a function, procedure, method, or other code with is invocable and which accepts one or more parameters and/or utilizes one or more variables which are defined outside the routine. Functions, procedures, and methods are all examples of "routines". For instance, a "routine" may be a function that returns a value, or a procedure that does not return a value.

ANTLR refers to ANother Tool for Language Recognition, a publically available parser generator.

MSSCASI refers to Microsoft® Source Code Analyzer for SQL Injection, a publically available source code dataflow analyzer.

"Annotations" include, for example, embedded statements which make assertions, embedded statements which suppress warnings, and macros which are defined in terms of one or more such statements. In particular, "annotation" as used herein includes both 'annotations' and 'suppressions' as those terms are used below in an ANTLR language parser specification example and in an MSSCASI readme example.

A program's source code is written in a programming language. The source code is then compiled or interpreted in order to run the program. The process of compiling or interpreting the source code is referred to herein as code generation. A "non-code-generative" portion of a source code is part of the source code that can be altered without changing the code instructions generated by code generation tools (such as compilers, interpreters, assemblers) when generating runnable code from the source code. For example, compilers and interpreters normally ignore comments placed in source code, so commented parts of source code are normally non-code-generative. String literals are also normally non-code-generative, because compilers and interpreters do not normally treat the content of a string literal as code that should be parsed. In languages that assign specific columns or other specific locations to source code, text outside the assigned location (e.g., columns above column 72 in some FORTRAN implementations) is normally non-code-generative, because compilers and interpreters normally ignore such text.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "statement(s)" means "one or more statements" or equivalently "at least one statement".

Whenever reference is made to data or instructions, it is understood that these items configure a computer-readable storage medium thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. The media 112 may be volatile memory, non-volatile memory, fixed in place media, removable media, magnetic media, optical media, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by annotating, interpreting, binding, deployment, execution, modification, display, creation, loading, and/or other operations.

Media 112 may be of different physical types. A program source code 120 containing routines 122 and a code-generative portion 124, compilers and other code generation tools 126, other software 128, and other items shown in the Figures may reside partially or entirely within one or more media 112, thereby configuring those media. SQL and/or TSQL statements 130 may be present, e.g., in websites that run software based on code 120 to obtain user data that is in turn used to generate or supply SQL/TSQL statements. An operating environment may also include a display 132, and other hardware 134, such as buses, power supplies, and accelerators, for instance. Some environments include a backend server 136 which receives and/or supplies data used in SQL/TSQL statements.

A given operating environment 100 may include an Integrated Development Environment (IDE) 138 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use extensible application environments, collaborative technologies, or both.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
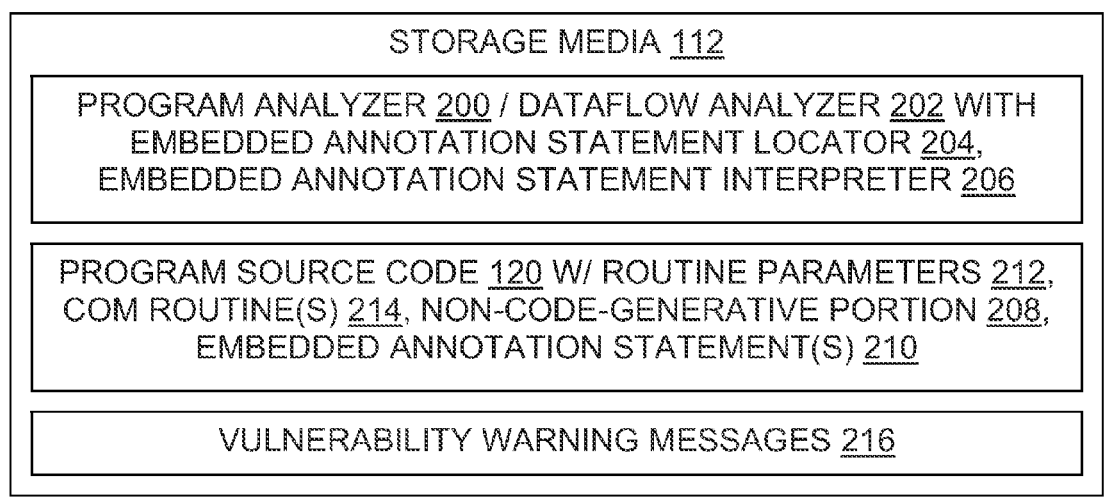
FIG. 2 is a block diagram illustrating an example architecture for dataflow analysis using embedded annotations.

FIG. 2 further illustrates an architecture which is suitable for use with some embodiments. A dataflow analyzer 202 contains an embedded annotation statement locator 204 and an embedded annotation statement interpreter 206. The program source code 120 has been annotated, in that one or more annotation statements 210 are embedded in one or more non-code-generative portions 208 of the code 120, such as in comments. The locator 204 is configured to locate the embedded statements 210 in the code 120 (e.g., by lexical analysis and parsing), and the interpreter 206 is configured to interpret the statements 210 during a dataflow analysis of the source code 120. Embedded statements may be associated in the source code with routines 122 and routine parameters 212, for example. Statements 210 may also be associated with routines, such as COM routines 214, which are referenced in the source code 120 but not defined in the source code 120. As a result of the dataflow analysis based on the source code 120 and the annotation statements 210, the dataflow analyzer 202 generates vulnerability warning messages 216 if it detects vulnerabilities in the source code 120. In particular, in some embodiments the system generates warnings about SQL/TSQL injection vulnerabilities. However, the annotation tools and techniques are not necessarily specific to searches for SQL injection vulnerabilities, or even to dataflow analysis or generating warnings. Technology described herein can be used for other kinds of analysis, such as flow-insensitive analyses, that generate other kinds of information, such as string length restrictions for translation purposes.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments include a computer system 102 having a logical processor 110, a memory (medium 112) in operable communication with the logical processor, and a program analyzer 200 (such as a dataflow analyzer 202) residing in the memory. The program analyzer 200 has an embedded annotation statement locator 204 configured for locating annotation statement(s) embedded in a non-code-generative portion (e.g., a comment) of a program source code also residing in the memory. The program source code is written in a first programming language (e.g., SQL, TSQL) recognized by a code generation tool for code generation; the annotation statement(s) are written in a second programming language, which is unrecognized by the first language's code generation tool. The program analyzer 200 also has an embedded annotation statement interpreter 206 configured for interpreting the annotation statement. The program analyzer 200 reports whether the program source code violates a condition specified with the annotation, e.g., whether preconditions and postconditions are met.

In some embodiments, the embedded annotation statements include one or more of the following statements. A define-NAME-as-expression statement allows a developer to define NAME as a short-hand (macro) for an expression, possibly parameterized, such as using a symbolic name in place of a so-called magic number. An include-filename statement allows a developer to direct the annotation processor to read the file denoted by 'filename' and interpret its contents as a sequence of statements. This mechanism allows sharing of statements across multiple source files, even if the source language itself has no such include mechanism. An if-statement allows a developer to conditionally enable a particular statements, such as suppressing warnings only if a certain environment variable is set. A block-statement allows a developer to group multiple statements together and treat it as one statement. A procedure-NAME statement allows a developer to define NAME as a short-hand (macro) for a statement, possibly parameterized. A NAME statement allows a developer to use a previously defined NAME. An attach-NAME statement allows a developer to direct the annotation processor to treat the given statements as if they were placed around the definition of source routine NAME. A suppression statement allows a developer to suppress warnings with a given number. Overall, these constructs allow a high-level vocabulary—understandable by humans—to be defined and used in the source code, which is unfolded into lower level statements understood by the program analyzer. This setup has a number of benefits, such as that it allows the (shared) definitions to be changed, for a new version of the program analyzer, say, without changing every instance in the source code, because the shorthand name can be the same. Some embodiments, such as Microsoft® Source Code Analyzer for SQL Injection, use this setup.

In some embodiments, the embedded annotation statements include at least one of the following macro statements. A SQL-prevalidated-parameter macro allows a developer to specify that the target of this macro should be assumed to already have been validated. A SQL-validate-parameter macro allows a developer to specify that the routine validates the parameter on which the macro is placed. A suppress-warning-unvalidated-SQL-executed macro allows a developer to suppress the generation of warnings on the following line. A SQL-attach-function-annotation macro can be implemented as the attach-NAME statement.

Methods

Figure 3:
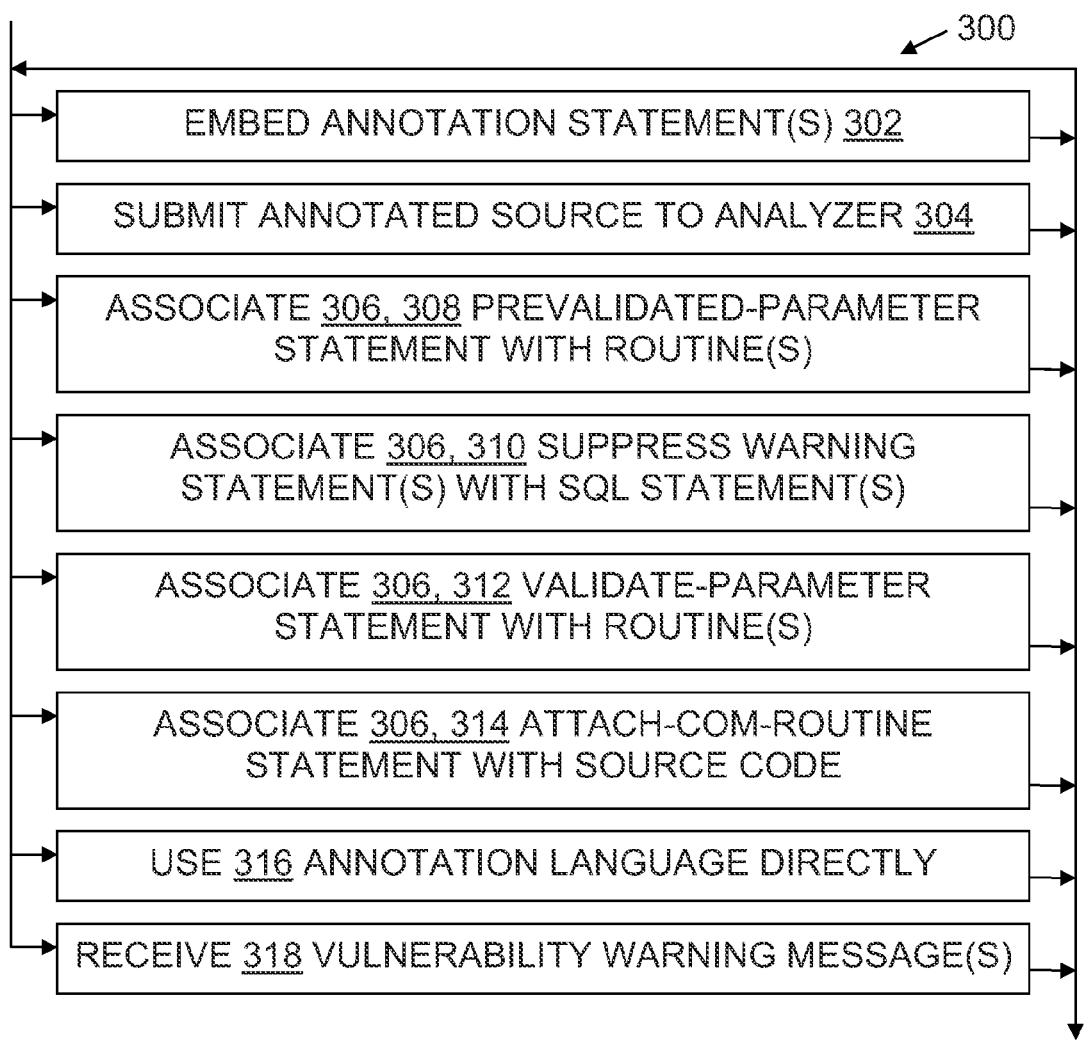
FIG. 3 is a flow chart illustrating steps of some method and configured storage medium embodiments, from a developer perspective.
Figure 4:
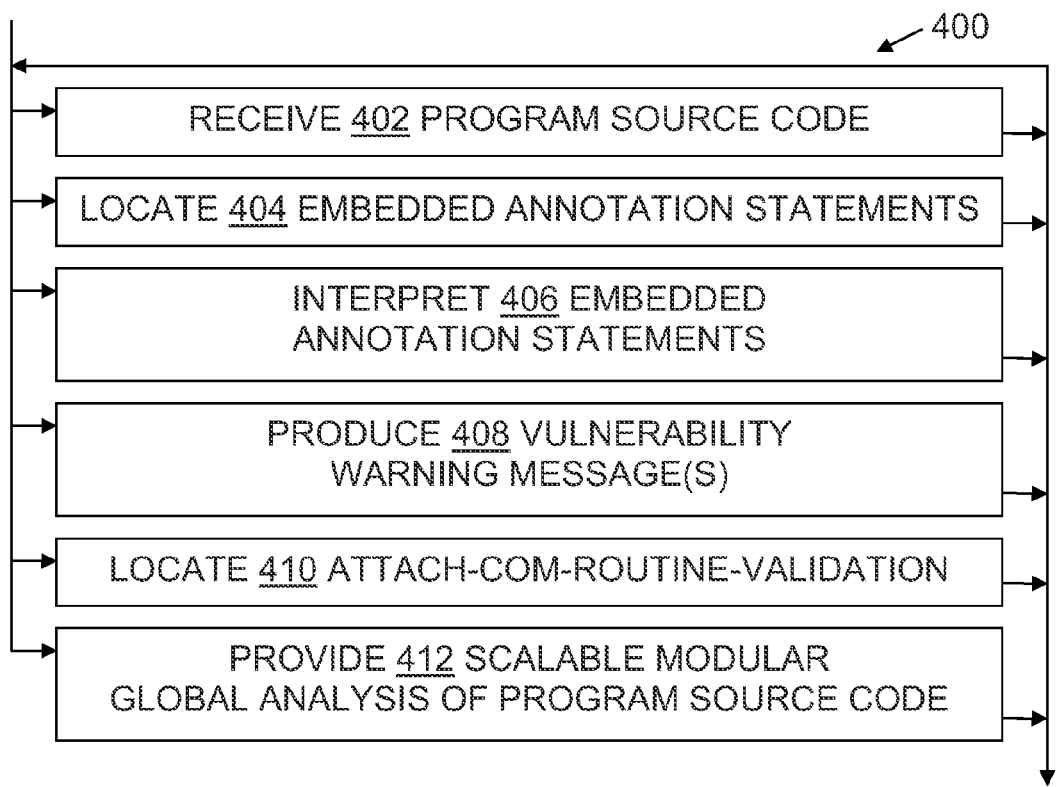
FIG. 4 is a flow chart illustrating steps of some method and configured storage medium embodiments, from a system perspective.

FIGS. 3 and 4 illustrate some method embodiments, in flowcharts 300 and 400. FIG. 3 illustrates developer methods, while FIG. 4 illustrates steps taken by a system, but a given embodiment may include steps from either or both of these Figures. Methods shown in the Figures may be performed in some embodiments automatically, e.g., by a dataflow analyzer 202 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in these Figures. Steps may be performed serially, in a partially overlapping manner, or fully in parallel. The order in which flowchart 300 and/or flowchart 400 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an embed annotation statement(s) step 302, a developer or an embodiment acting on behalf of a developer embeds annotation statement(s) 210 in program source code. Step 302 may be accomplished, for example, by writing comment delimiter(s) in the program source 120 and writing annotation statement(s) inside the commented area, or by writing annotation statement(s) and then placing comment delimiter(s) to make the compiler treat the annotation statement(s) as comment text.

During an annotated source submitting step 304, a developer or an embodiment acting on behalf of a developer submits to a program analyzer 200 annotated program source code, namely, program source code in which annotation statement(s) 210 have been embedded 302. Step 304 may be accomplished by passing the program source code file name as a command line parameter, for example. An embodiment may also integrate support for annotation statement(s) (e.g., statement auto-completion) and/or support for a program analyzer 200 (e.g., automated invocation) into an IDE 138.

During one or more associating steps 306, a developer or an embodiment acting on behalf of a developer associates particular annotation statement(s) with program source code, such as by associating the statement(s) with routine(s) 122 in the program source code. Step(s) 306 may be accomplished by embedding the annotation statement(s) in a specified relation to routine(s), e.g., immediately preceding the routine(s) in question, in the same file as the routine(s), or in the same project or assembly as the routine(s).

During a prevalidated parameter statement associating step 308, for example, a prevalidated parameter annotation statement 210 is associated with one or more routines 122.

Similarly, during a suppress warnings statement associating step 310, a suppress warnings annotation statement 210 is associated with one or more routines 122.

Similarly, during a validate parameter statement associating step 312, a validate parameter annotation statement 210 is associated with one or more routines 122.

Similarly, during an attach-COM-routine statement associating step 314, an attach-COM-routine annotation statement 210 is associated with one or more routines 122.

During an annotation language direct use step 316, a developer or an embodiment acting on behalf of a developer uses the annotation language directly by using one or more statements that are not macros. That is, the statement(s) 210 in question are interpreted by the interpreter 206 without first being each mapped to other statements 210. Using step 316 may include step(s) 302, 304, and/or 306.

During a vulnerability message receiving step 318, a developer or an embodiment acting on behalf of a developer receives one or more messages generated by the program analyzer 200 indicating a presence/absence of a vulnerability based on analysis in the annotated program source code.

During a source code receiving step 402, an embodiment receives annotated program source code. Step 402 corresponds generally to submitting step 304, with step 402 being in the system's perspective and step 304 being in the system user's perspective.

During an annotation locating step 404, an embodiment locates annotation statement(s) 210 in program source code. Step 404 may be accomplished by lexical analysis and/or parsing, for example, to locate markers that signal the presence of annotation statement(s). In one implementation, a marker "@@embed" is used, but one or more other markers may be used in other implementations to signal the presence of annotation statement(s). An implementation may also use annotation language keywords without a marker (markers apply to multiple keywords/statements). Step 404 may optionally be implemented in a manner that is aware of comments and/or other non-code-generative portions, to make location of annotation statement(s) more efficient by skipping over code-generative portions when scanning for annotation statement(s).

During an annotation interpreting step 406, an embodiment interprets annotation statement(s) 210 in program source code. Step 406 may include dataflow analysis and/or other forms of program analysis. The annotations are interpreted in context; the program analyzer is aware of the program source code in which the annotation is embedded.

During a vulnerability message producing step 408, an embodiment produces vulnerability message(s) based on the program analysis. In particular, some embodiments produce vulnerability messages directed to SQL injection vulnerabilities of the analyzed annotated program source code. Step 408 may produce the messages in the form of information on a display 132, a printed paper, a file, and/or a network transmission, for example.

During a COM routine validation attaching step 410, an embodiment attaches routine validation information from a COM routine. This allows a developer to specify that an external COM routine validates the referenced parameter, where after the program analyzer assumes it is safe to use in a SQL query henceforth.

During a global analysis providing step 412, an embodiment provides a global analysis of annotated program source code, such as a scalable modular global analysis. Step 412 may include 402-408 with program source in which every routine has been annotated, for example.

Configured Media

Some embodiments include a configured computer-readable storage medium 112. Medium 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory, which may be removable or not, and may be volatile or not, can be configured into an embodiment using items such as annotation statements 210 and dataflow analyzers 202, in the form of data 118 and instructions 116, read from a removable medium 114 and/or another source such as a network connection, to form a configured medium. The configured medium 112 is capable of causing a computer system to perform method steps for transforming source code through annotation and/or dataflow analysis as disclosed herein. FIGS. 1 through 4 thus help illustrate configured storage media embodiments and method embodiments, as well as system and method embodiments. In particular, any of the method steps illustrated in FIG. 3 and/or FIG. 4, or otherwise taught herein, may be used to help configure a storage medium to form a configured medium embodiment. Automated processes may be users, and in particular may perform steps illustrated in FIG. 3.

Additional Examples

Additional details and design considerations are provided below. As with the other examples herein, the features described may be used individually and/or in combination, or not at all, in a given embodiment.

A Microsoft® Source Code Analyzer for SQL Injection solution provides an example of a dataflow analyzer 202. The tool provided by the solution is referred to herein as the MSSCASI tool, or as MSSCASI. The solution includes a readme file, from which modified excerpts are provided below.

Microsoft Source Code Analyzer for SQL Injection is a static code analysis tool to help find SQL Injection vulnerabilities in Active Server Pages (ASP) code. The readme file outlines tool usage, how to review the results from the tool, available annotation support and how to mitigate the identified vulnerabilities. Topics covered include: Pre-Requisites, SQL Injection issues in ASP, Usage, Defect Viewer, Reviewing the warnings, Annotation Support, Limitations, ANTLR License, Resources. The excerpts herein are based on all but the last two topics.

As to the topic of Pre-Requisites, in one embodiment the command line tool uses Microsoft .NET Framework 2.0 software.

As to the topic of SQL Injection issues in ASP, if user-supplied data from ASP's Request.Form or Request.Querystring collections is used to construct dynamic SQL statements without any data validation, then attackers can inject SQL commands into the SQL statement and misuse it. This is generally referred to as First Order SQL Injection vulnerability. If user input is stored in a database by using one ASP page and then retrieved from the database and used to construct dynamic SQL statements in a different ASP page, then attackers can inject SQL commands into the SQL statement and misuse it. This is generally referred to as Second Order SQL Injection vulnerability.

One way to mitigate these vulnerabilities is to use Parameterized SQL queries. Information on SQL Injection vulnerabilities in ASP and ways to mitigate them was published at msdn dot microsoft dot com/en-us/library/cc676512 dot aspx.

In some situations, the Microsoft® Source Code Analyzer for SQL Injection helps find some of these vulnerabilities automatically.

As to the topic of Usage:
msscasi_asp.exe [Options]/Input=file.asp
Description:
The MSSCASI tool analyzes Microsoft® ASP code for SQL Injection vulnerabilities.

| Options: | |
|---|---|
| /GlobalAsaPath=path | Path to global.asa |
| /IncludePaths=path;..; | path Paths to include files |
| /Output=file | Generate warnings as XML in 'file' for the viewer |
| /Append | Append to the output file instead of overwriting |
| /NoLogo | Do not display the tool logo |
| /Quiet | Do not display any parsing errors |
| /Suppress=num;..;num | Do not report specified warnings |

EXAMPLES

```
msscasi_asp.exe /input="c:\source\logon.asp"
msscasi_asp.exe /input="c:\source\logon.asp"
  /output="warnings.xml"
msscasi_asp.exe /GlobalAsaPath="C:\source"
  /input="c:\source\display.asp"
msscasi_asp.exe /input="c:\display.asp"
  /IncludePaths="C:\vd1;C:\vd2"
msscasi_asp.exe /input="c:\source\webitems\display.asp"
  /suppress="80406;80407"
```

The tool can analyze files included using absolute paths, but if you have any virtual includes then you will have to specify the corresponding absolute paths in /IncludePaths switch.

As to the topic of Defect Viewer, the MSSCASI tool shipped with Prefast Defect Viewer. In order to view the warnings in Prefast Defect Viewer, one will need to use/output option of the tool to generate an output xml file. Once an output xml file is generated one can launch the defect viewer with the following syntax.

msscasi_view.cmd [fullpathtooutput.xml]

For example, if you have three ASP files to be analyzed you can use the following commands to analyze them. You can use/append option to generate one warnings.xml file that contains warnings related to all three files.

```
msscasi_asp.exe /input="c:\source\file1.asp"
  /output="c:\output\warnings.xml" /append
msscasi_asp.exe /input="c:\source\file2.asp"
  /output="c:\output\warnings.xml" /append
msscasi_asp.exe /input="c:\source\file3.asp"
  /output="c:\output\warnings.xml" /append
```

You can then use the Prefast Defect Viewer to view the warnings using the following command:

msscasi_view.cmd c:\output\warnings.xml

As to the topic of Reviewing the warnings, the MSSCASI tool generates the following six warnings:

80400—Possible SQL Injection vulnerability through data that is read from the Request object without any input validation. These warnings are very likely bugs that must be fixed.

80406—Possible SQL Injection vulnerability through data that is read from the Request object where the input is passed through some unknown function calls that might perform data validation. If there is no data validation done inside the function call, then these are likely bugs else these are likely false positives.

80403—Possible SQL Injection vulnerability through data that comes from a backend server. If the data is controlled by an end user through some other web page then these are likely bugs. But if the data is well trusted then these may not be bugs. It is still a good practice to parameterize these queries as a defense in depth.

80407—Possible SQL Injection vulnerability through data that comes from a backend server and is passed through some unknown function calls. If the data is controlled by an end user through some other web pages and if there is no data validation performed on this data, then these are likely bugs.

80420—Possible SQL Injection vulnerability through function parameters. These warnings are generated at function scope, so if the function parameter values come from trusted sources then these are false positives. If the parameter values are controlled by end users then these are very likely bugs. You can use _sql_pre_validated annotation on the function parameters to detect if end users can reach this code.

80421—Possible SQL Injection vulnerability through function parameters and the function parameters are passed through some unknown function calls that might perform data validation. You can use _sql_pre_validated annotation on the function parameters and _sql_validate on validation function to detect if end users can reach this code.

Of all the warnings that the tool generates, C80400 warnings are most likely to be bugs. ASP web developers must fix them with parameterized queries [2].

The following sections discuss these four warnings in detail.

Warning 80400—This warning is generated when the input read from the Request object (Request.Form, Request.QueryString) is directly used in the construction of a SQL statement without any input validation. You should use parameterized SQL queries to fix these issues; see the MSSCASI readme file for reference information. For example, assume you have the following ASP code:

```
<%@ Language=VBScript %>
<HTML>
<HEAD>
<META NAME="GENERATOR" Content="Microsoft Visual Studio 6.0">
</HEAD>
<BODY>
<%
Err.Clear
ON ERROR RESUME NEXT
strAuthor    = Request.Form("AUTHORNAME")
If strAuthor = "" Then
    Response.Write "AUTHORNAME is not supplied"
    Response.End
End if
strConnectString = "Provider=SQLOLEDB.1; Data Source=sqlmac;Initial Catalog=Test;Integrated Security=SSPI;;"
Set objConn = Server.CreateObject("ADODB.CONNECTION")
Set objRS = Server.CreateObject("ADODB.RECORDSET")
Set objCommand = Server.CreateObject("ADODB.COMMAND")
' Connect to SQL Server
objConn.Open(strConnectString)
If Err.number Then
    'Log the error and transfer control to a different page.
    Server.Transfer ("\Maintenance.asp")
End If
' Execute the command
strCmd = "select title, description from books where author_name = '" & strAuthor & "'"
Set objCommand.ActiveConnection = objConn
objCommand.CommandText = strCmd
objCommand.CommandType = adCmdText
Set objRS = objCommand.Execute( )
' Process the resultset
Do Until objRS.EOF
    Response.Write Server.HTMLEncode(objRS.Fields("title"))
    & vbCRLF
    objRS.MoveNext
Loop
' Close the objects
objRS.Close
Set objRS = Nothing
objConn.Close
Set objConn = Nothing
%>
</BODY>
</HTML>
```

For the foregoing code, the MSSCASI tool will generate the following output:

```
requestform_com_Query.asp(37) : : warning C80400: Unvalidated HTTP
Request data possibly executed,
making 'VBSMAIN' potentially vulnerable to first-order SQL Injection attacks.
Reported by Microsoft (R) Source Code Analyzer for SQL Injection on tracked
object OBJCOMMAND (created as return.FORM`11).
Path summary:
  - {return.FORM}[return.FORM`11 : string_unvalidated] created on 'Request' (line 11)
  - {return.FORM}[return.FORM`11 : string_unvalidated] to {STRAUTHOR,
return.FORM`
}[return.FORM`11 : string_unvalidated] by assignment (line 11)
  - {STRAUTHOR, return.FORM}[return.FORM`11 : string_unvalidated] to
{STRAUTHOR,
STRCMD, return.FORM}[return.FORM`11 : string_unvalidated] on 'Transfer' (line
32
)
  - {STRAUTHOR, STRCMD, return.FORM}[return.FORM`11 : string_unvalidated]
to {$,
STRAUTHOR, STRCMD, return.FORM}[return.FORM`11 : string_unvalidated] on
'Transfer' (line 34)
  - {$, STRAUTHOR, STRCMD, return.FORM}[return.FORM`11 :
string_unvalidated] to {
OBJCOMMAND}[return.FORM`11 : command_unvalidated] on 'TaintCommand'
(line 34)
  - {OBJCOMMAND}[return.FORM`11 : command_unvalidated] to
{OBJCOMMAND}[return.FORM`11 :
$error] on 'Execute' (line 37)
  : Lines: 9, 10, 11, 13, 18, 19, 20, 21, 24, 26, 32, 33, 34, 37
```

With regard to the details of the output, the following statements mention that the code path outlined in this warning is vulnerable to first order SQL Injection attacks:

```
requestform_com_Query.asp(37) : : warning C80400: Unvalidated HTTP
Request data possibly executed,
making 'VBSMAIN' potentially vulnerable to
first-order SQL Injection attacks.
Reported by Microsoft (R) Source Code Analyzer
for SQL Injection on tracked object OBJCOMMAND (created
as return.FORM 11).
```

If the script is not contained in a function body, the MSSCASI tool assumes that it is in VBSMAIN function. The MSSCASI tool also gives the line number where the input is read (11, at the end of the second statement) and where the final command is executed (37, besides the filename). If you look at the asp source code, strAuthor is assigned a value from Request.QueryString("AUTHORNAME") on line number 11 and is eventually used in the construction of dynamic SQL and executed through OBJCOMMAND on line number 37.

The following lines mention the state transfers along with the line numbers:
Path Summary:

```
- {return.FORM}[return.FORM`11 : string_unvalidated] created on 'Request' (line 11)
- {return.FORM}[return.FORM`11 : string_unvalidated] to {STRAUTHOR,
return.FORM`
}[return.FORM`11 : string_unvalidated] by assignment (line 11)
- {STRAUTHOR, return.FORM}[return.FORM`11 : string_unvalidated] to
{STRAUTHOR,
STRCMD, return.FORM}[return.FORM`11 : string_unvalidated] on 'Transfer' (line
32
)
- {STRAUTHOR, STRCMD, return.FORM}[return.FORM`11 : string_unvalidated]
to {$,
STRAUTHOR, STRCMD, return.FORM}[return.FORM`11 : string_unvalidated] on
'Transfer' (line 34)
- {$, STRAUTHOR, STRCMD, return.FORM}[return.FORM`11 :
string_unvalidated] to {
OBJCOMMAND}[return.FORM`11 : command_unvalidated] on 'TaintCommand'
(line 34)
- {OBJCOMMAND}[return.FORM`11 : command_unvalidated] to
{OBJCOMMAND}[return.FORM`11 :
$error] on 'Execute' (line 37)
```

Request.QueryString("AUTHORNAME") is treated as untrusted input. Because this value is assigned to strAuthor, strAuthor is also treated as untrusted input. Since strAuthor is directly used in strCmd, strCmd is treated as untrusted input. strCmd is finally assigned as a CommandText to objCommand and is executed on 37, so this is flagged as vulnerability.

The final line of the output in this example contains the code path in the web page that can be used by a malicious user to exploit this vulnerability:

:Lines: 9, 10, 11, 13, 18, 19, 20, 21, 24, 26, 32, 33, 34, 37

The following code snippet uses parameterized SQL query to mitigate the SQL Injection identified by the tool:

```
' Execute the command
strCmd = "select title, description from books where
author_name = ?"
Set objCommand.ActiveConnection = objConn
objCommand.CommandText = strCmd
objCommand.CommandType = adCmdText
Set param1 = objCommand.CreateParameter ("author", adWChar,
adParamInput, 50)
param1.value = strAuthor
objCommand.Parameters.Append param1
```

Warning 80406—This warning is generated when the input read from the Request object (Request.Form, Request.QueryString) is directly used in the construction of a SQL statement. The main difference from the previous warning and this warning is that the input is passed through a function call, which may or may not be a validation function. You can annotate Validation functions for better analysis and suppress false positives with annotations. If this is a bug then you should use parameterized SQL queries to fix these issues; see the MSSCASI readme file for reference information.

Assume you have the following ASP code:

```
<%@ Language=VBScript %>
<HTML>
<HEAD>
<META NAME="GENERATOR" Content="Microsoft Visual Studio
6.0">
</HEAD>
```

```
<BODY>
<%
Err.Clear
ON ERROR RESUME NEXT
strAuthor        = Request.Form("AUTHORNAME")
If Not ValidateInput(strAuthor) Then
    Server.Transfer ("\Errorpage.asp")
End If
strConnectString = "Provider=SQLOLEDB.1; Data
Source=sqlmac; Initial Catalog=Test;Integrated
    Security=SSPI;;"
Set objConn = Server.CreateObject("ADODB.CONNECTION")
Set objRS = Server.CreateObject("ADODB.RECORDSET")
Set objCommand = Server.CreateObject("ADODB.COMMAND")
' Connect to SQL Server
objConn.Open(strConnectString)
If Err.number Then
    'Log the error and transfer control to a different page.
    Server.Transfer ("\Maintenance.asp")
```

```
End If
'   Execute the command
strCmd = "select title, description from books where
author_name = '" & strAuthor & "'"
Set objCommand.ActiveConnection = objConn
objCommand.CommandText = strCmd
'   objCommand.CommandType = adCmdText
Set objRS = objCommand.Execute( )
'   Process the resultset
Do Until objRS.EOF
  Response.Write Server.HTMLEncode(objRS.Fields("title"))
& vbCRLF
  objRS.MoveNext
Loop
'   Close the objects
objRS.Close
Set objRS = Nothing
objConn.Close
Set objConn = Nothing
Private Function ValidateInput(ByVal strInput)
    ValidateInput = true
    Set reg = New RegExp
    reg.Global = True
    reg.Pattern = "^[A-ZA-z0-9]+$"
    If Not reg.Test(strAuthor) Then
        'Accept only valid input and reject all other input
        ValidateInput = False
    End If
End Function
%>
</BODY>
</HTML>
```

This code is very similar to the first example, but there is input validation on strAuthor value.

If you run the MSSCASI tool on this file, the tool will generate the following output:

```
requestform_com_Query.asp(36) : warning C80406: Unvalidated HTTP Request
data possibly executed, making 'VBSMAIN' potentially vulnerable to first-order
SQL Injection attacks. Low confidence. Reported by Microsoft (R) Source Code
Analyzer for SQL Injection on tracked object OBJCOMMAND (created as
return.FORM`11).
Path summary:
  - {return.FORM}[return.FORM`11 : string_unvalidated] created on 'Request' (line 11)
  - {return.FORM}[return.FORM`11 : string_unvalidated] to {STRAUTHOR,
return.FORM
}[return.FORM`11 : string_unvalidated] by assignment (line 11)
  - {STRAUTHOR, return.FORM}[return.FORM`11 : string_unvalidated] to
{STRAUTHOR,
return.FORM}[return.FORM`11 : string_unvalidated_low] on 'UnknownCall' (line
13)
  - {STRAUTHOR, return.FORM}[return.FORM`11 : string_unvalidated_low] to
{STRAUTH
OR, STRCMD, return.FORM}[return.FORM`11 : string_unvalidated_low] on
'Transfer'
(line 31)
  - {STRAUTHOR, STRCMD, return.FORM}[return.FORM`11 :
string_unvalidated_low] to
{$, STRAUTHOR, STRCMD, return.FORM}[return.FORM`11 :
string_unvalidated_low] on
'Transfer' (line 33)
  - {$, STRAUTHOR, STRCMD, return.FORM}[return.FORM`11 :
string_unvalidated_low]
to {OBJCOMMAND}[return.FORM`11 : command_unvalidated_low] on
'TaintCommand' (line 33)
  - {OBJCOMMAND}[return.FORM`11 : command_unvalidated_low] to
{OBJCOMMAND}[return.FORM`11 :
$error] on 'Execute' (line 36)
  : Lines: 9, 10, 11, 13, 17, 18, 19, 20, 23, 25, 31, 32, 33, 36
```

With regard to the details of the output, as in the previous example the warning says that the input is read on line number 11 and is eventually used in the construction of a SQL statement and is executed through OBJCOMMAND on line number 36:

--- requestform_com_Query.asp(36) : warning C80406: Unvalidated HTTP Request data possibly executed, making 'VBSMAIN' potentially vulnerable to first-order SQL Injection attacks. Low confidence. Reported by Microsoft (R) Source Code Analyzer for SQL Injection on tracked object OBJCOMMAND (created as return.FORM`11).

---

Path Summary information is also very similar to the previous example, except the following state transfer, which says that the unvalidated input in passed through an unknown call, so marking it as string_unvalidated_low.

---

- {STRAUTHOR, return.FORM}[return.FORM`11 : string_unvalidated] to {STRAUTHOR, return.FORM}[return.FORM`11 : string_unvalidated_low] on 'UnknownCall' (line 13)

---

Depending on how the function call is made, this can either be a bug or a false positive. In this case, ValidateInput uses RegExp.Test to validate the user input is alphanumeric, so this is a false positive. You can annotate this function so that the tool will not generate these warnings. Please look at the Annotation section for details on annotating the validation functions.

Warning 80403—This warning is generated when the input read from database is used in the construction of a SQL statement without any data validation, commonly referred to as a Second Order Injection vulnerability. You should use parameterized SQL queries to fix these issues; see the MSS-CASI readme file for reference information.

Assume you have the following ASP code:

---

```
<%@ Language=VBScript %>
<HTML>
<BODY>
<%
strBookID = Request.QueryString("BOOKID")
strConnectString = "Provider=SQLOLEDB; Data
Source=sqlmac;Initial Catalog=test;Integrated
Security=SSPI;"
Set objConn = Server.CreateObject("ADODB.CONNECTION")
Set objCommand = Server.CreateObject("ADODB.COMMAND")
Set objCommand1 = Server.CreateObject("ADODB.COMMAND")
Set rsBook = Server.CreateObject("ADODB.RECORDSET")
Set rsBooks = Server.CreateObject("ADODB.RECORDSET")
' Connect to SQL Server
objConn.Open(strConnectString)
' Execute the command
strCmd = "select book_title, book_description, author_name
from books where book_id=?"
objCommand.CommandText = strCmd
objCommand.CommandType = adCmdText
Set param1 = objCommand.CreateParameter ("id", adInteger,
adParamInput)
param1.value = strBookID
objCommand.Parameters.Append param1
' Open the recordset, another way of executing SQL
statements
rsBook.Open objCommand, objConn
' Process the resultset
If rsBooks.EOF = False Then
  ' Get other books authored by the same person
  strAuthorName = rsBook.Fields("author_name")
  strCmd = "select * from books where author_name='" +
strAuthorName + "'"
  ' Execute this query and process the results
  Set objCommand1.ActiveConnection = objConn
  objCommand1.CommandText = strCmd
  objCommand1.CommandType = adCmdText
  Set rsBooks = objCommand1.Execute( )
  ' Process the books
End If
' Close the objects
%>
</BODY>
</HTML>
```

---

The MSSCASI tool will generate the following output:

--- requestform_com_Query.asp(38) : warning C80403: Unvalidated SQL database result possibly executed, making 'VBSMAIN' potentially vulnerable to second-order SQL Injection attacks. Reported by Microsoft (R) Source Code Analyzer for SQL Injection on tracked object OBJCOMMAND1 (created as return.CREATEOBJECT'9).
Path summary:
 -{return.CREATEOBJECT}[return.CREATEOBJECT`9 : command_ok] created on 'Command
' (line 9)
 - {return.CREATEOBJECT}[return.CREATEOBJECT`9 : command_ok] to {OBJCOMMAND, return.CREATEOBJECT}[return.CREATEOBJECT`9 : command_ok] by assignment (line 9)
 -{OBJCOMMAND, return.CREATEOBJECT}[return.CREATEOBJECT`9 : command_ok] to {OBJ
COMMAND, _VBS_APPEND.arg.this, return.CREATEOBJECT}[return.CREATEOBJECT`9 : command_ok] on 'Transfer' (line 23)
 - {OBJCOMMAND, _VBS_APPEND.arg.this, return.CREATEOBJECT}[return.CREATEOBJECT`9 : command_ok] to {RSBOOK}[return.CREATEOBJECT`9 : result_unvalidated] on 'Execute' (line 26)

-{RSBOOK}[return.CREATEOBJECT˙9 : result_unvalidated] to
{return.FIELDS}[return.CREATEOBJECT˙9 : string2_unvalidated] on 'Field' (line 31)
 - {return.FIELDS}[return.CREATEOBJECT˙9 : string2_unvalidated] to
{STRAUTHORNAME, return.FIELDS}[return.CREATEOBJECT˙9 : string2_unvalidated] by assignment (line 31)
 -{STRAUTHORNAME, return.FIELDS}[return.CREATEOBJECT˙9 : string2_unvalidated] to {STRAUTHORNAME, STRCMD, return.FIELDS}[return.CREATEOBJECT˙9 : string2_unvalidated] on 'Transfer' (line 32)
 - {STRAUTHORNAME, return.FIELDS}[return.CREATEOBJECT˙9 : string2_unvalidated] to {$, STRAUTHORNAME, STRCMD, return.FIELDS}[return.CREATEOBJECT˙9 : string2_unvalidated] on 'Transfer' (line 36)
 -{$, STRAUTHORNAME, STRCMD, return.FIELDS}[return.CREATEOBJECT˙9 : string2_unvalidated] to {OBJCOMMAND1}[return.CREATEOBJECT˙9 : command2_unvalidated] on 'TaintCommand' (line 36)
 - {OBJCOMMAND1}[return.CREATEOBJECT˙9 : command2_unvalidated] to {OBJCOMMAND1}[return.CREATEOBJECT˙9 : $error] on 'Execute' (line 38)
 : Lines: 6, 7, 8, 9, 10, 11, 12, 15, 18, 19, 20, 21, 22, 23, 26, 29, 31, 32, 35, 36, 37, 38

With regard to the details of the output, the following two statements mention that the code path outlined in the warning is vulnerable to second order SQL Injection attacks and the input responsible for SQL Injection is created on the line number 9 and is finally executed on 38:

```
requestform_com_Query.asp(38) : warning C80403:
Unvalidated SQL database result possibly executed,
making 'VBSMAIN' potentially vulnerable to second-
order SQL Injection attacks. Reported by Microsoft (R) Source Code
Analyzer for SQL Injection on tracked object OBJCOMMAND1
(created as return.CREATEOBJECT˙9).
```

If the script is not contained in a function body, the tool assumes that it is in VBSMAIN function. VBSMAIN is a coined name for the code on the page that is not in any function; some embodiments treat it as a function to avoid special-casing that code.

This is a Second Order SQL Injection vulnerability, so the MSSCASI tool first identifies the object that executes a SQL statement and then keeps track of the Resultset object. Accordingly, the first few lines of output mention that OBJCOMMAND is being treated as an object that can return potentially untrusted data:

- {return.CREATEOBJECT}[return.CREATEOBJECT˙9 : command_ok] created on 'Command' (line 9)
  - {return.CREATEOBJECT}[return.CREATEOBJECT˙9 : command_ok] to {OBJCOMMAND, return.CREATEOBJECT}[return.CREATEOBJECT˙9 : command_ok] by assignment (line 9)
  - {OBJCOMMAND, return.CREATEOBJECT}[return.CREATEOBJECT˙9 : command_ok] to {OBJCOMMAND, __VBS__APPEND.arg.this, return.CREATEOBJECT}[return.CREATEOBJECT˙9 : command_ok] on 'Transfer' (line 23)

On line 26, OBJCOMMAND object is executed so the MSSCASI tool marks RSBOOKS as untrusted data:

- {OBJCOMMAND, __VBS__APPEND.arg.this, return.CREATEOBJECT}[return.CREATEOBJECT˙9 : command_ok] to {RSBOOK}[return.CREATEOBJECT˙9 : result_unvalidated] on 'Execute' (line 26)

The following lines mention that rsBook.Fields("author_name") read on 31 is treated as untrusted input. Because rsBook.Fields("author_name") is assigned to strAuthorName, strAuthorName is also treated as untrusted input. On line 32, strCmd is constructed from strAuthorName so strCmd is also treated as untrusted data. Finally on line 36, the command is executed:

- {RSBOOK}[return.CREATEOBJECT˙9 : result_unvalidated] to
{return.FIELDS}[return.CREATEOBJECT˙9 : string2_unvalidated] on 'Field' (line 31)
  - {return.FIELDS}[return.CREATEOBJECT˙9 : string2_unvalidated] to
{STRAUTHORNAME, return.FIELDS}[return.CREATEOBJECT˙9 : string2_unvalidated] by assignment (line 31)
  - {STRAUTHORNAME, return.FIELDS}[return.CREATEOBJECT˙9 : string2_unvalidated] to {STRAUTHORNAME, STRCMD, return.FIELDS}[return.CREATEOBJECT˙9 : string2_unvalidated] on 'Transfer' (line 32)
  - {STRAUTHORNAME, STRCMD, return.FIELDS}[return.CREATEOBJECT˙9 : string2_unvalidated] to {$, STRAUTHORNAME, STRCMD, return.FIELDS}[return.CREATEOBJECT˙9 : string2_unvalidated] on 'Transfer' (line 36)

-continued

```
- {$, STRAUTHORNAME, STRCMD, return.FIELDS}[return.CREATEOBJECT`9 :
string2__unvalidated] to {OBJCOMMAND1}[return.CREATEOBJECT`9 :
command2__unvalidated] on 'TaintCommand' (line 36)
  - {OBJCOMMAND1}[return.CREATEOBJECT`9 : command2__unvalidated] to
{OBJCOMMAND1}[
return.CREATEOBJECT`9 : $error] on 'Execute' (line 38)
```

Finally, line numbers are displayed by MSSCASI so that you can follow the path that is vulnerable to second order SQL Injection attacks:

Lines: 6, 7, 8, 9, 10, 11, 12, 15, 18, 19, 20, 21, 22, 23, 26, 29, 31, 32, 35, 36, 37, 38

The following code snippet uses parameterized SQL query to mitigate the SQL Injection identified by MSSCASI:

```
If rsBooks.EOF = False Then
   ' Get other books authored by the same person
   strAuthorName = rsBook.Fields("author_name")
   strCmd = "select * from books where author_name=?"
   ' Execute this query and process the results
   Set objCommand1.ActiveConnection = objConn
   objCommand1.CommandText = strCmd
   objCommand1.CommandType = adCmdText
   Set authParam = objCommand.CreateParameter ("author",
adWChar, adParamInput, 50)
   authParam.value = strAuthorName
   objCommand1.Parameters.Append authParam
   rsBooks.Open objCommand1, objConn
   ' Process the books
End If
```

Warning 80407—This warning is generated when the input read from a database is used in the construction of a SQL statement. This is generated to warn against Secord Order Injection vulnerabilities. The only difference from the previous warning and this one is that the data is passed through a function call, which may or may not be a validation function. You can annotate Validation functions for better analysis or suppress false positives with annotations. If this a bug then you should use parameterized SQL queries to fix these issues; see the MSSCASI readme file for reference information.

Warning 80420—This warning is generated when the function parameters are directly used in the construction of a SQL statement without any input validation. These warnings are very similar to 80400 except that the injection is possible through function parameters instead of Request object. You can use _sql_pre_validated annotation (explained under Annotations section) to determine if the end user can exploit this bug. Or you can use parameterized SQL queries to fix these issues; see the MSSCASI readme file for reference information.

For example, assume you have the following ASP code:

```
<%@ Language=VBScript %>
<HTML>
<HEAD>
<META NAME="GENERATOR" Content="Microsoft Visual Studio 6.0">
</HEAD>
<BODY>
<%
```

-continued

```
   Err.Clear
   ON ERROR RESUME NEXT
   strAuthor      = Request.Form("AUTHORNAME")
   DisplayRecords strAuthor
   Private Sub DisplayRecords (ByVal strAuthor)
      strConnectString = "Provider=SQLOLEDB.1; Data
Source=sqlmac;Initial Catalog=Test; Integrated
Security=SSPI;;"
      Set objConn = Server.CreateObject("ADODB.CONNECTION")
      Set objRS = Server.CreateObject("ADODB.RECORDSET")
      Set objCommand = Server.CreateObject("ADODB.COMMAND")
      ' Connect to SQL Server
      objConn.Open(strConnectString)
      If Err.number Then
         'Log the error and transfer control to a different
page.
         Server.Transfer ("\Maintenance.asp")
      End If
      ' Execute the command
      strCmd = "select title, description from books where
author_name = '" & strAuthor & "'"
      Set objCommand.ActiveConnection = objConn
      objCommand.CommandText = strCmd
      objCommand.CommandType = adCmdText
      Set objRS = objCommand.Execute( )
      ' Process the resultset
      Do Until objRS.EOF
         Response.Write
Server.HTMLEncode(objRS.Fields("title")) & vbCRLF
         objRS.MoveNext
      Loop
      ' Close the objects
      objRS.Close
      Set objRS = Nothing
      objConn.Close
      Set objConn = Nothing
   End Sub
%>
</BODY>
</HTML>
```

Then the MSSCASI tool will generate the following output:

```
requestform_com_Query.asp(36) : warning C80420: Unvalidated
function parameter possibly executed. Reported by Microsoft (R) Source
Code Analyzer for SQL Injection on tracked object
OBJCOMMAND (created as STRAUTHOR`16).
Path summary:
  - {STRAUTHOR}[STRAUTHOR`16 : string_input] created on
'Parameter' (line 16)
  - {STRAUTHOR}[STRAUTHOR`16 : string_input] to
  {STRAUTHOR, STRCMD}[STRAUTHOR`16
: string_input] on 'Transfer' (line 31)
  - {STRAUTHOR, STRCMD}[STRAUTHOR`16 : string_input] to {$,
STRAUTHOR, STRCMD}[STRAUTHOR`16 : string_input] on
'Transfer' (line 33)
  - {$, STRAUTHOR, STRCMD}[STRAUTHOR`16 : string_input] to
{OBJCOMMAND}[STRAUTHOR
`16 : command_input] on 'TaintCommand' (line 33)
  - {OBJCOMMAND}[STRAUTHOR`16 : command_input] to
{OBJCOMMAND}[STRAUTHOR`16 : $error] on 'Execute' (line 36)
  : Lines: 16, 17, 18, 19, 20, 23, 25, 31, 32, 33, 36
```

Now assume you add prevalidated annotation at the function level:

```
<%@ Language=VBScript %>
<HTML>
<HEAD>
<META NAME="GENERATOR" Content="Microsoft Visual Studio 6.0">
</HEAD>
<BODY>
<%
Err.Clear
ON ERROR RESUME NEXT
strAuthor        = Request.Form("AUTHORNAME")
DisplayRecords strAuthor
Private Sub DisplayRecords (ByVal strAuthor)
    ' @@embed __sql__pre__validated(strAuthor)
    strConnectString = "Provider=SQLOLEDB.1; Data Source=sqlmac;Initial Catalog=Test; Integrated Security=SSPI;;"
    Set objConn = Server.CreateObject("ADODB.CONNECTION")
    Set objRS = Server.CreateObject("ADODB.RECORDSET")
    Set objCommand = Server.CreateObject("ADODB.COMMAND")
    ' Connect to SQL Server
    objConn.Open(strConnectString)
    If Err.number Then
        'Log the error and transfer control to a different page.
        Server.Transfer ("\Maintenance.asp")
    End If
    ' Execute the command
    strCmd = "select title, description from books where author__name = '" & strAuthor & "'"
    Set objCommand.ActiveConnection = objConn
    objCommand.CommandText = strCmd
    objCommand.CommandType = adCmdText
    Set objRS = objCommand.Execute( )
    ' Process the resultset
    Do Until objRS.EOF
        Response.Write Server.HTMLEncode(objRS.Fields("title")) & vbCRLF
        objRS.MoveNext
    Loop
    ' Close the objects
    objRS.Close
    Set objRS = Nothing
    objConn.Close
    Set objConn = Nothing
End Sub
%>
</BODY>
</HTML>
```

The MSSCASI tool will then issue an 80400 warning indicating that attackers can potentially inject SQL through Request.Form("AUTHORNAME"): requestform_com_Query.asp(13):warning C80400: Unvalidated HTTP Request data possibly executed, making 'VBSMAIN' potentially vulnerable to first-order SQL Injection attacks. Reported by Microsoft (R) Source Code Analyzer for SQL Injection on tracked object STRAUTHOR (created as return.FORM'11). Path Summary:

```
- {return.FORM}[return.FORM`11 : string__unvalidated]
created on 'Request' (line 11)
- {return.FORM}[return.FORM`11 : string__unvalidated]
to {STRAUTHOR, return.FORM
}[return.FORM`11 : string__unvalidated] by assignment (line 11)
- {STRAUTHOR, return.FORM}[return.FORM`11 : string__unvalidated]
to {STRAUTHOR,
return.FORM}[return.FORM`11 : $error] on 'Precondition' (line 13)
 : Lines: 9, 10, 11, 13
```

Warning 80421—This warning is generated when the function parameters are directly used in the construction of a SQL statement without any input validation. The only difference from the previous warning and this one is that the function parameter is passed through a function call, which may or may not be a validation function. You can annotate Validation functions for better analysis or suppress false positives with annotations. If this a bug then you should use parameterized SQL queries to fix these issues; see the MSSCASI readme file for reference information.

As to the topic of Annotation support, the following sections describe annotation support available with the MSS-CASI tool.

As to Suppressing False Positives, you can suppress a false positive with the following statement, which is to be written on the line above the statement that executes a SQL statement:

'@@embed _suppress_warning_unvalidated_sql_executed

Here is an example of suppressing a false positive:

```
<%
Err.Clear
ON ERROR RESUME NEXT
strAuthor        = Request.Form("AUTHORNAME")
Set reg = New RegExp
reg.Global = True
reg.Pattern = "^ [A-Za-z0-9]+$"
If Not reg.Test(strAuthor) Then
    'Accept only valid input and reject all other input
    Server.Transfer ("\Errorpage.asp")
End If
strConnectString = "Provider=SQLOLEDB.1; Data Source=sqlmac;Initial Catalog=Test;Integrated Security=SSPI;;"
Set objConn = Server.CreateObject("ADODB.CONNECTION")
Set objRS = Server.CreateObject("ADODB.RECORDSET")
Set objCommand = Server.CreateObject("ADODB.COMMAND")
' Connect to SQL Server
objConn.Open(strConnectString)
' Execute the command
strCmd = "select title, description from books where author__name = '" & strAuthor & "'"
Set objCommand.ActiveConnection = objConn
objCommand.CommandText = strCmd
objCommand.CommandType = adCmdText
' @@embed __suppress_warning_unvalidated__sql__executed
Set objRS = objCommand.Execute( )
```

As to Annotating Validation Functions, some developers rely on validation functions to accept only valid input. If you have hundreds of places where you rely on a validation function to mitigate SQL Injection vulnerabilities, then suppressing every single instance of dynamic SQL Injection is going to be time consuming. You can remove all the false positives showing up by annotating the validation function by using the following annotation:

'@@embed _sql_validate(paramname)

The following example shows how to annotate a validation function:

```
Private Function ValidateInput(ByVal strInput)
    ' @@embed __sql__validate(strInput)
    ValidateInput = true
    Set reg = New RegExp
    reg.Global = True
    reg.Pattern = "^ [A-Za-z0-9]+$"
```

```
        If Not reg.Test(strAuthor) Then
            'Accept only valid input and reject all other input
            ValidateInput = False
        End If
    End Function
```

In the previous code snippet, ValidateInput takes one argument strInput and checks to see if all the characters contained in it are alphanumeric characters. Annotating this (function, parameter) pair will suppress warnings generated on code paths where the input is validated using this validation function.

As to Annotating Pre-Validation conditions, in one version, the MSSCASI tool performs local analysis to find many SQL Injection issues. It keeps of track of data read from the Request object and if that data is used in the construction of dynamic SQL within that function body then it will flag a potential vulnerability. If your code reads data from end users in one function and passes the data to other functions which construct and execute dynamic SQL then the tool will issue 80420 and 80421 warnings instead of 80400 and 80406 warnings. You can determine if attackers can reach this code path by annotating the functions that execute dynamic SQL with the following statement:

'@@embed _sql_pre_validated(paramname)

The following example shows how to use this annotation. Once the pre-condition is annotated, the tool will generate warnings for all entry points into this function from user controlled data. That is, once the API is annotated, the tool will generate warnings for all calls to this function with user-controlled, unvalidated data.

```
<%
Err.Clear
ON ERROR RESUME NEXT
strAuthor       = Request.Form("AUTHORNAME")
DisplayRecords strAuthor
Private Sub DisplayRecords (ByVal strAuthor)
    ' @@embed __sql_pre_validated(strAuthor)
    strConnectString = "Provider=SQLOLEDB.1; Data
Source=sqlmac;Initial Catalog=Test;Integrated
Security=SSPI;;"
    Set objConn = Server.CreateObject("ADODB.CONNECTION")
    Set objRS = Server.CreateObject("ADODB.RECORDSET")
    Set objCommand = Server.CreateObject("ADODB.COMMAND")
    ' Connect to SQL Server
    objConn.Open(strConnectString)
    If Err.number Then
        'Log the error and transfer control to a different
page.
        Server.Transfer ("\Maintenance.asp")
    End If
    ' Execute the command
    strCmd = "select title, description from books where
author_name = '" & strAuthor & "'"
    Set objCommand.ActiveConnection = objConn
    objCommand.CommandText = strCmd
    obj Command.CommandType = adCmdText
    Set objRS = objCommand.Execute( )
    ' Process the resultset
    Do Until objRS.EOF
        Response.Write
Server.HTMLEncode(objRS.Fields("title")) & vbCRLF
        objRS.MoveNext
    Loop
    ' Close the objects
    objRS.Close
    Set objRS = Nothing
    objConn.Close
    Set objConn = Nothing
End Sub
%>
```

After this annotation, the tool will issue either 80400 or 80406 if end users can reach this code path.

As to Annotating APIs defined in COM controls, if your ASP code executes SQL statements using functions defined in COM controls then the MSSCASI tool will not by default generate any warnings, as the function definitions are missing in ASP pages. You can annotate these APIs using an attach macro. For example, if you have a component with Prog ID "Provider.Class" and a member function ExecSQL that executes a SQL statement. You can annotate it using the following syntax:

```
' @@embed attach __VBS_EXECSQL(this, x) {
    __sql_pre_validated(x) }
```

The function name in the annotation is in the format of _VBS_[FunctionNameinCapitalLetters]. Since the function name is ExecSQL, it should be written as _VBS_EXECSQL. The first argument this is a dummy name to represent the instance of a class and is followed by the number of arguments accepted by the function ExecSQL. In this case, ExecSQL only takes one argument which is a SQL statement that will be executed, so that is represented using x.

An efficient place to annotate these APIs is in global.asa file so that it will be visible across all the ASP pages.

The following example shows how to use this attach annotation. Once the API is annotated, the tool will generate warnings for all entry points into this function from user controlled data.

```
<%
Err.Clear
ON ERROR RESUME NEXT
strAuthor = Request.Form("AUTHORNAME")
    ' @@embed attach __VBS_EXECSQL(abc, x) {
    __sql_pre_validated(x) }
strConnectString = "Provider=SQLOLEDB.1; Data
Source=sqlmac;Initial Catalog=Test;Integrated
Security=SSPI;;"
Set objRS = Server.CreateObject("ADODB.RECORDSET")
Set objCommand = Server.CreateObject("CustomProvider.CMD")
' Execute the command
strCmd = "select title, description from books where
author_name = '" & strAuthor & "'"
Set objRS = objCommand.ExecSQL(strCmd)
%>
```

After this annotation, the tool will issue 80400, 80403, 80406 or 80407 warnings if end users can reach this code path. In this particular code snippet, the tool will generate 80400.

With regard to Limitations, some limitations of the MSSCASI tool are the following. The tool only understands ASP code written using VBScript. It currently does not analyze server side code written in any other languages, such as Jscript. The MSSCASI team developed a new ASP parser as part of this tool development. It is possible that we may have not covered all ASP constructs, so you may see some parsing errors like the following, which may be reported at the SQL Security discussion forum.

**msscasi_asp: Parse error at c:\source\file1.asp (line XX, column YY): Syntax Error The MSSCASI tool includes ANTLR binary software under an ANTLR license below. Details are available in the MSSCASI readme file.

The MSSCASI readme file also contains references to pointers for various best practices documentation, for preventing SQL Injections in ASP, for giving SQL Injection the respect it deserves, and for more information regarding the MSSCASI tool.

The MSSCASI tool embedded annotation statements discussed above are implemented as macros of an annotation language which contains more primitive annotation statements. One may also one would use the annotation language directly by using statements that are not MSSCASI macros.

Not also that SQL injection is merely an example. Some embodiments can be used to find other kinds of defects, and/or other information, using embedded annotation statements.

In some embodiments, directed at SQL Injection and ASP (VBScript), the MSSCASI macros expand to the following:

We allow $(NAME) to fetch an expression/filename segment from the environment. An include file accepts the same language, except we omit the preamble token (default: @@embed). Unbound NAMEs in an expression are to be bound in the host environment (e.g., parameter names etc). Bound NAMEs are dynamically scoped, and the same name can be overloaded with respect to number of parameters. Double quotes can be replaced with single quotes. Files are only included once per session (i.e., imagine an implicit #pragma once). Whitespace is allowed, except NEWLINE if embedded. Arbitrary text is allowed before and after each sentence. This will allow us to parse a whole source file, no matter the language. The explicit placement (attach/detach) allows "model" and/or "baseline"-files. Another feature is that 'grep-v "@@embed"' can strip out annotations/suppressions (if vehicles are full lines). An included file will also accept // as a line comment. Note that block does not induce scope and that functions may not be recursive. The language is thus not Turing-complete. Conditionals and suppressions are compile-time resolved. The SAL statements are turned into statements in the analysis Intermediate Representation (IR) and interpreted as applying at that point in the analysis. SAL guards are turned into analysis-time conditionals (e.g., "if (guard) then XX") in the analysis IR guarding the above

```
  attach __VBS_TRANSFER { sal post A_NORETURN; sal post A_NOTHROW
}           // On Server
  attach __VBS_END { sal post A_NORETURN; sal post A_NOTHROW
}           // On Response
  procedure __sql_validate(x, out) { sal post A_SQLESCAPED at x }
  procedure __sql_validate_byref(x, out) { sal post A_SQLESCAPED at *x }
  procedure __sql_validate(x) { sal post A_SQLESCAPED at x }
  procedure __sql_validate_byref(x) { sal post A_SQLESCAPED at *x }
  procedure __sql_sanitize_byref(x) { sal post A_SQLESCAPED at *x }
  procedure __sql_pre_validated(x) { sal pre A_SQLESCAPED at x }
  procedure __sql_pre_validated_byref(x) { sal pre A_SQLESCAPED at *x }
  procedure __suppress_warning_unvalidated_sql_executed { warning suppress
80400; warning suppress 80403; warning suppress 80406; warning suppress
80407; warning suppress 80420; warning suppress 80421 }
  procedure __enable_warning_unvalidated_sql_executed { warning enable
80400; warning enable 80403; warning enable 80406; warning enable 80407;
warning suppress 80420; warning suppress 80421 }
  procedure __disable_warning_unvalidated_sql_executed { warning disable
80400; warning disable 80403; warning disable 80406; warning disable 80407;
warning suppress 80420; warning suppress 80421 }
```

In some embodiments, the MSSCASI macros use an annotation language defined using ANTLR, as illustrated in a file known as "embedded.g" which is excerpted below.

The language is intended for embedding suppressions and annotations in arbitrary places, notably comments. In one version, it accepts the following general sentences:

```
  @@embed preamble "token"
  @@embed define NAME <expression>
  @@embed define NAME(x,...,y) <expression>
  @@embed include "<filename>"
  @@embed if (<expression>) <rawstatement> (else
<rawstatement>)?
  @@embed { <rawstatement>; ..; <rawstatement> }
  @@embed procedure NAME <rawstatement>
  @@embed procedure NAME(x,...,y) <rawstatement>
  @@embed NAME
  @@embed NAME(<expression>,..,<expression>)
  @@embed attach NAME <rawstatement> (detach <rawstatement>)?
  @@embed attach NAME(x,...,y) <rawstatement> (detach
<rawstatement>)?
``` statements, so that the dataflow analysis can easily and precisely pick up the correlation between the guard and the statement.

One version includes the following suppression sentences:

```
  @@embed warning (suppress|disable) <expression> (,
"<reason>")? (guard <expression>)?
  @@embed warning enable <expression>
  @@embed warning (push|pop)
```

Note that the main suppression scenario supported is:

```
Include (autogenerated, ideally, from defectdefs.xml) file
   'foo.i' with:
define WARNING_NULL_DEREF 26500
..
```

```
Source files (say, 'bar.sql'):
    -- @@embed include "$(ESP_ROOT)\foo.i"
blah blah
    -- @@embed warning suppress WARNING_NULL_DEREF
    offending line of code
blah blah
```

One version includes the following expressions:

```
NAME | true | false | NUMBER | [ <expression>(-
<expression>)?, .., <expression(-<expression>)?] |
$(NAME) | NAME(<expression>,..,<expression>) | NAME (.|->|::
NAME)+ | *<expression> | &<expression>
    ( <expression> ) | <expression> || <expression> |
<expression> && <expression>
ident "NAME" | <expression> binop <expression> | return
```

One version includes the following annotations related to Microsoft Standard Annotation Language (SAL):

```
@@embed sal (pre|post)? NAME (at <expression>)? (guard
<expression>)?
@@embed sal (pre|post)? NAME(<expression>,..,<expression>)
(at <expression>)? (guard <expression>)?
```

For annotations, we allow pre/post and target to be implicit. This supports more advanced vehicles like attributes, where these things are given. It's then up to the host environment to make the correct bindings. The NAME is the tag, such as A_NOTNULL. A variation would allow declaration of new annotations with signature on-the-fly. The main annotation scenario supported is:

```
Include file 'foo.i' with:
    procedure __in { sal pre A_NOTNULL; sal pre A_VALID}
    procedure __in(x) {    sal pre A_NOTNULL at x; sal pre A_VALID
at x}
    procedure __range(x,y) {    sal A_RANGE(x,y)    }
        ..
Source files (say, 'bar.sql'):
-- @@embed include "$(ESP_ROOT)\foo.i"
create procedure bar
(
-- @@embed { __in; __range(1,20)   }
@maxtrans int = 1
)
as
blah blah
create procedure bar2 ( @maxtrans int = 1 )
as
-- @@embed __in(@maxtrans)
blah blah
```

In MSIL (Microsoft Intermediate Language, an intermediate representation), we can use attributes as the vehicle if we want:

```
[Sal("include 'foo.i'")]
class Bar
{
    public void Foo([Sal("__in")] string name)
    {
        blah blah
    }
    ..
}
```

Note that it's here imperative that 'foo.i' is deterministic if used repeatedly, because classes are not ordered in managed assemblies.

The ANTLR "embedded.g" file notes the foregoing in comments, and also states:

```
header "pre_include_hpp" {
#include <platforms/antlr/parser/espast.h>
using Esp::IR::EspAst;
using Esp::IR::RefEspAst;
}
options
{
    language = "Cpp";
}
// Headers for generated parser.
{
using namespace Esp::IR;
}
```

The Esp references are to ESP, a system that uses a combination of scalable alias analysis and property simulation to verify that large code bases obey temporal safety properties. ESP is described in "M. Das, S. Lerner, and M. Seigle. *ESP: Path-sensitive program verification in polynomial time*. In Prog. Lang. Design and Impl., pages 57-68, New York, N.Y., 2002. ACM Press."

The ANTLR embedded.g file continues:

```
class EmbeddedParser extends Parser;
options
{
    k = 3;
    buildAST = true;
    ASTLabelType = RefEspAst;
    defaultErrorHandler=false;
}
tokens
{
    // Meta
    L_ROOT; L_PARAMETERLIST; L_ARGUMENTLIST;
    // Statements.
    L_BLOCK; L_PREAMBLE; L_DEFINITION; L_INCLUDE;
L_IF; L_PROCEDUREDEFINITION;
    L_PROCEDURECALL;   L_ATTACH; L_WARNING; L_SAL;
    // Expressions.
    L_IDENTIFIER; L_NUMBER; L_DEREF; L_DOT; L_ARROW;
L_SCOPE; L_PAREN; L_USEDEFINITION;
    L_RETURN;
}
file:
    (statement)* EOF! { #file = #([L_ROOT, "root"], #file); };
blockstatement:
    LCURLY^ statement (SEMI! statement)* RCURLY! {
#blockstatement->setType(L_BLOCK); };
statement:
    "preamble"^ STRING
        { #statement->setType(L_PREAMBLE); }
    | "define"^ NAME (parameters)? expression
        { #statement->setType(L_DEFINITION); }
```

```
| "include"^ STRING
        { #statement->setType(L_INCLUDE); }
| "if"^ LPAREN! expression RPAREN! statement (options {
warnWhenFollowAmbig = false; } : "else"! statement)?
        { #statement->setType(L_IF); }
| "procedure"^ NAME (parameters)? statement
        { #statement->setType(L_PROCEDUREDEFINITION); }
| NAME^ (operands)?
        { #statement->setType(L_PROCEDURECALL); }
| "attach"^ NAME (parameters)? statement (options {
warnWhenFollowAmbig = false; } : "detach"! statement)?
        { #statement->setType(L_ATTACH); }
| "warning"^ suppression
        { #statement->setType(L_WARNING); }
| "sal"^ ("pre"|"post")? NAME annotationtail
        { #statement->setType(L_SAL); }
| blockstatement;
suppression:
    ( "suppress" |"disable" | "enable" ) expression;
annotationtail:
  (operands)? ("at"! expression)?;
```

We keep annotationtail separate to get better error recovery on target-less embedded annotations with trash afterwards. The ANTLR embedded.g file continues:

```
operands:
    LPAREN^ expression (COMMA! expression)* RPAREN! {
#operands->setType(L_ARGUMENTLIST); #operands-
>setText("opnds"); };
parameters:
    LPAREN^ NAME (COMMA! NAME)* RPAREN! { #parameters-
>setType(L_PARAMETERLIST); #parameters->setText("params");};
expression:
    expression_140;
expression_140:
    expression_120 ( (PLUS^ | MINUS^ | STAR^)
expression_120)*;
expression_120:
    expression_100
| NUMBER
| STRING;
expression_100:
    NAME
| "return" { #expression_100->setType(L_RETURN); }
| STAR^ expression_100 { #expression_100->setType(L_DEREF);
};
class EmbeddedLexer extends Lexer;
// Lookahead needed for the longest token.
options {   k = 3; }
COLON : ':';
COMMA : ',';
SCOPE : ':' ':';
SEMI : ';';
LPAREN : '(';
RPAREN : ')';
PLUS : '+';
MINUS : '-';
LCURLY : '{';
RCURLY : '}';
STAR : '*';
STRING : ('\"' ((~('\"'|'\n'))+ | '\\' '\"')* '\"') | ('""'
((~('""'|'\n'))+ | '\\' '""')* '""');
NAME :
('a'..'z'|'A'..'Z'|'_'|'@')('a'..'z'|'A'..'Z'|'_'|'@'|'0'..'
9')*;
NUMBER : ('0'..'9')+;
WS : ( ' '|'\t'|'\r')+ {
$setType(ANTLR_USE_NAMESPACE(antlr)Token::SKIP); };
NEWLINE : '\n' {
$setType(ANTLR_USE_NAMESPACE(antlr)Token::SKIP); newline( );
};
SL_COMMENT:
    "//" ( ~'\n' )* ( '\n' )? {
$setType(ANTLR_USE_NAMESPACE(antlr)Token::SKIP); newline( );
};
```

In some embodiments, the following extension of ANTLR abstract syntax trees is used to include precise Sfa info, thereby avoiding an extra data structure representing Sfas (source file addresses: i.e., filename/line/column):

```
#pragma once
//
// Extension of ANTLR ASTS to include precise Sfa info.
//
#include <sfa.h>
#include <antlr/commonast.hpp>
namespace Esp
{
namespace IR
{
class EspAst;
typedef antlr::ASTRefCount<EspAst> RefEspAst;
class ANTLR_API EspAst : public antlr::CommonAST
{
public:
    EspAst( );
    EspAst(antlr::RefToken t);
    EspAst(const EspAst& t);
    __override antlr::RefAST clone(void) const;
                __override void initialize( antlr::RefAST t );
                __override void initialize( antlr::RefToken t );
    //
    // Extension
    const struct Sfa*& Sfa( );
    void *& Payload( );
    static antlr::RefAST factory( void );
private:
    const struct Sfa* sfa_;
    void * payload_;
public:
    static void Initialize(SfaManager* sm, const
std::string& file);
    static void Destroy( );
    static SfaManager* Manager( );
    static std::string File( );
private:
    static SfaManager* manager;
    static std::string file;
};
} // IR
} // Esp
```

In some embodiments, the following code (from a file known as "vbscript2.txt) is used in a data analyzer implementation:

```

# Detects improperly validated input that are used in a SQL
query.

# NOTE:
# - Use /xx/i matching, because VBS is case-insensitive.
string TOOL "{Tool:Microsoft (R) Source Code Analyzer for
SQL Injection}";
string ESCAPE_COMMAND_INPUT "Unvalidated HTTP Request data
possibly executed, making '$error.function.name' potentially
vulnerable to first-order SQL Injection attacks.";
string ESCAPE_COMMAND_RESULT "Unvalidated SQL database
result possibly executed, making '$error.function.name'
potentially vulnerable to second-order SQL Injection
attacks.";
string ESCAPE_PARAMETER "Unvalidated function parameter
possibly executed.";
string ESCAPE_COMMAND TOOL "{Code:80400}"
ESCAPE_COMMAND_INPUT;
string ESCAPE_COMMAND2 TOOL "{Code:80403}"
ESCAPE_COMMAND_RESULT;
string ESCAPE_COMMAND_LOW TOOL "{Code:80406}"
ESCAPE_COMMAND_INPUT " Low confidence.";
string ESCAPE_COMMAND2_LOW TOOL "{Code:80407}"
ESCAPE_COMMAND_RESULT " Low confidence.";
string ESCAPE_MISSING_SAL TOOL "{Code:80420}"
ESCAPE_PARAMETER;
string ESCAPE_MISSING_SAL_LOW TOOL "{Code:80421}"
ESCAPE_PARAMETER " Low confidence.";
predicate IsVariable(tracking) is not (tracking:{STRING} or
tracking:{PLUS} or tracking:{CONSTANT} or
tracking:{CONVERT_INTERPRET} or
tracking:TYPE:KIND:'MANAGEDPOINTER');
predicate IsEscapeChar(str) is str:{STRING /(\[|\]|'|")/} or
str:{CONVERT_INTERPRET {STRING /(\[|\]|'|")/}};
predicate IsEscapeCharDef(str) is IsEscapeChar(str) or
(str:DEFINITION:tmp and IsEscapeChar(tmp));
predicate MatchCreateRecordSet(node, obj) is not
(obj:{SYMBOL sym}
                                              and
node:CFG:NODE:{CALL /^__VBS_CreateObject$/i {SYMBOL
"__VBS_SERVER"} {STRING name} RETURNS:{SYMBOL ret}}
                                              and
node:CFG:NODE:{EXPRESSION {ASSIGN {SYMBOL sym} {SYMBOL
ret}}}
                                              and not
name:/^AdoDb.RecordSet$/i);
predicate MatchCreateCommand(node, obj) is not (obj:{SYMBOL
sym}
                                              and
node:CFG:NODE:{CALL /^__VBS_CreateObject$/i {SYMBOL
"__VBS_SERVER"} {STRING name} RETURNS:{SYMBOL ret}}
                                              and
node:CFG:NODE:{EXPRESSION {ASSIGN {SYMBOL sym} {SYMBOL
ret}}}
                                              and not
name:/^AdoDb.(Command|Connection)$/i);
pattern UntrustedInput after   {ENTRY ARGUMENT:{SYMBOL
tracking}} and
                                (not {ENTRY
PRECONDITION:{A_SQLESCAPED {SYMBOL tracking}}}) and
IsVariable(tracking);
pattern RequestCreate after {CALL
/^__VBS_(QueryString|Form|Default_Property)$/i {SYMBOL
"__VBS_REQUEST"} RETURNS:tracking};
pattern CommandCreate after {CALL /^__VBS_CreateObject$/i
{SYMBOL "__VBS_SERVER"} {STRING /AdoDb.Command/i}
RETURNS:tracking};
pattern CookieCreate after {CALL /^__VBS_(Cookies)$/i
{SYMBOL "__VBS_REQUEST"} RETURNS:tracking};
pattern Concatenate after {EXPRESSION {ASSIGN lhs rhs}} and
SUBCHILD(rhs, tracking) and IsVariable(tracking);
pattern PassThru after {CALL
/^__VBS_(Trim|Lcase|Left|Ltrim|Mid|Right|Rtrim|StrReverse|Ucase)$/i
tracking RETURNS:lhs} and IsVariable(tracking)
                    or ({CALL /^__VBS_Replace$/i tracking
data RETURNS:lhs} and IsVariable(tracking) and not
IsEscapeCharDef(data));
```

-continued

```
pattern FieldCall after {CALL /^__VBS_(Fields|GetString)$/i
{CONVERT_INTERPRET tracking} RETURNS:lhs} and
IsVariable(tracking);
pattern FieldArrayCall after {CALL /^__VBS_(GetRows)$/i
{CONVERT_INTERPRET tracking} RETURNS:lhs} and
IsVariable(tracking);
pattern NextRecordSetCall after {CALL
/^__VBS_(NextRecordSet)$/i {CONVERT_INTERPRET tracking}
RETURNS:lhs} and IsVariable(tracking);
pattern PreValidatedCall after {CALL
PRECONDITION:{A_SQLESCAPED tracking}} and
IsVariable(tracking);
pattern ValidateCall after {CALL POSTCONDITION:{A_SQLESCAPED
tracking}} and IsVariable(tracking);
pattern CommandTransfer after {EXPRESSION {ASSIGN {ARROW
{CONVERT_INTERPRET lhs} /^(CommandText|CommandStream)$/i}
rhs}} and (SUBCHILD(rhs, tracking) or rhs=tracking) and
IsVariable(tracking);
pattern RecordSetTransfer after {EXPRESSION {ASSIGN {ARROW
{CONVERT_INTERPRET lhs} /^(Source)$/i} rhs}} and
(SUBCHILD(rhs, tracking) or rhs=tracking) and
IsVariable(tracking);
# Not Server.Execute or Open on AdoDb.Connection objects
pattern ExecCall after ((({CALL /^__VBS_Execute$/i
{CONVERT_INTERPRET tracking} RETURNS:lhs} and
MatchCreateCommand($0, tracking)) or
                ({CALL /^__VBS_Execute$/i
{CONVERT_INTERPRET connection} tracking RETURNS:lhs} and
MatchCreateCommand($0, connection)))
                    and IsVariable(tracking);
pattern OpenCall after {CALL /^__VBS_Open$/i
{CONVERT_INTERPRET lhs} tracking} and IsVariable(tracking)
and MatchCreateRecordSet($0, lhs);
pattern PureOpenCall after {CALL /^__VBS_Open$/i
{CONVERT_INTERPRET tracking}} and IsVariable(tracking) and
(not $0:ARGUMENT2:exists) and MatchCreateRecordSet($0,
tracking);
pattern ArrayIndex after {CALL /^__VBS_Default_Property$/i
{CONVERT_INTERPRET tracking} RETURNS:lhs} and
IsVariable(tracking);
pattern AnyOtherCall before {CALL {SYMBOL f} ARGUMENT:a} and
(a=tracking or SUBCHILD(a, tracking)) and
IsVariable(tracking) and (not $0:PRECONDITION:{A_SQLESCAPED
tracking})
                and not
(f:NAME:/^__VBS_(QueryString|Form|Cookies|Default_Property|Create
Object|Open|Execute|Fields|GetRows|NextRecordSet|Replace
|Trim|Lcase|Left|Ltrim|Mid|Right|Rtrim|StrReverse|Ucase)$/i
);
statemachine UnquotedSql
{
    # state : {string, command, result, input} x {(first),
second} x {ok, unvalidated} x {(pure), low}
    terminal state dropped;
    state string_unvalidated;
    state string_unvalidated_low;
    state string2_unvalidated;
    state string2_unvalidated_low;
    state string_input;
    state string_input_low;
    state string_col_unvalidated;
    state string_col_unvalidated_low;
    state string2_col_unvalidated;
    state string2_col_unvalidated_low;
    state command_ok;
    state command_unvalidated;
    state command_unvalidated_low;
    state command2_unvalidated;
    state command2_unvalidated_low;
    state command_input;
    state command_input_low;
    state result_ok;
    state result_unvalidated;
    state result_unvalidated_low;
    state result2_unvalidated;
```

```
    state result2_unvalidated_low;
    state result_input;
    state result_input_low;
    event Parameter patterns UntrustedInput(tracking)
creation;
    event Request patterns RequestCreate(tracking) creation;
    event Command patterns CommandCreate(tracking) creation;
    event Cookie patterns CookieCreate(tracking) creation;
    event UnknownCall patterns AnyOtherCall(tracking);
    event Transfer patterns Concatenate(tracking, lhs)
PassThru(tracking, lhs) $chain $identity;
    event TaintCommand patterns CommandTransfer(tracking,
lhs) $chain;
    event TaintRecordSet patterns
RecordSetTransfer(tracking, lhs) $chain;
    event NextRecordSet patterns NextRecordSetCall(tracking)
$chain $identity;
    event Validate patterns ValidateCall(tracking);
    event Field patterns FieldCall(tracking, lhs) $chain
$identity;
    event FieldArray patterns FieldArrayCall(tracking, lhs)
$chain $identity;
    event Index patterns ArrayIndex(tracking, lhs) $chain
$identity;
    event Execute patterns ExecCall(tracking, lhs)
OpenCall(tracking, lhs) $chain $identity;
    event Open patterns PureOpenCall(tracking);
    event Precondition patterns PreValidatedCall(tracking);
    transition $start to string_input on Parameter;
    transition $start to string_unvalidated on Request;
    transition $start to command_ok on Command;
    transition $start to string_col_unvalidated on Cookie;
    transition on TaintCommand
        from string_unvalidated          to command_unvalidated
        from string_unvalidated_low      to
command_unvalidated_low
        from string_input                to command_input
        from string_input_low            to command_input_low
        from string2_unvalidated         to
command2_unvalidated
        from string2_unvalidated_low     to
command2_unvalidated_low;
    transition on TaintRecordSet
        from string_unvalidated          to result_unvalidated
        from string_unvalidated_low      to
result_unvalidated_low
        from string_input                to result_input
        from string_input_low            to result_input_low
        from string2_unvalidated         to result2_unvalidated
        from string2_unvalidated_low     to
result2_unvalidated_low
        from command_unvalidated         to result_unvalidated
        from command_unvalidated_low     to
result_unvalidated_low
        from command_input               to result_input
        from command_input_low           to result_input_low
        from command2_unvalidated        to result2_unvalidated
        from command2_unvalidated_low    to
result2_unvalidated_low;
    transition on Validate
        from string_unvalidated          to dropped
        from string_unvalidated_low      to dropped
        from string_input                to dropped
        from string_input_low            to dropped
        from string2_unvalidated         to dropped
        from string2_unvalidated_low     to dropped
        from command_unvalidated         to command_ok
        from command_unvalidated_low     to command_ok
        from command_input               to command_ok
        from command_input_low           to command_ok
        from command2_unvalidated        to command_ok
        from command2_unvalidated_low    to command_ok
        from result_unvalidated          to result_ok
        from result_unvalidated_low      to result_ok
        from result_input                to result_ok
        from result_input_low            to result_ok
        from result2_unvalidated         to result_ok
        from result2_unvalidated_low     to result_ok
        from string_col_unvalidated      to dropped
        from string_col_unvalidated_low  to dropped
```

-continued

```
            from string2_col_unvalidated         to dropped
            from string2_col_unvalidated_low to dropped;
        transition on UnknownCall
            from string_unvalidated             to
string_unvalidated_low
            from string_input                   to string_input_low
            from string2_unvalidated            to
string2_unvalidated_low
            from string_col_unvalidated         to
string_col_unvalidated_low
            from string2_col_unvalidated        to
string2_col_unvalidated_low
            from command_unvalidated            to
command_unvalidated_low
            from command_input                  to command_input_low
            from command2_unvalidated           to
command2_unvalidated_low
            from result_unvalidated             to
result_unvalidated_low;
        transition on Field
            from result_ok                      to string2_unvalidated
            from result_unvalidated             to string2_unvalidated
            from result_unvalidated_low         to
string2_unvalidated_low
            from result_input                   to string2_unvalidated
            from result_input_low               to
string2_unvalidated_low
            from result2_unvalidated            to string2_unvalidated
            from result2_unvalidated_low        to
string2_unvalidated_low;
        transition on FieldArray
            from result_ok                      to
string2_col_unvalidated
            from result_unvalidated             to
string2_col_unvalidated
            from result_unvalidated_low         to
string2_col_unvalidated_low
            from result_input                   to
string2_col_unvalidated
            from result_input_low               to
string2_col_unvalidated_low
            from result2_unvalidated            to
string2_col_unvalidated
            from result2_unvalidated_low        to
string2_col_unvalidated_low;
        transition on Index
            from string_col_unvalidated         to string_unvalidated
            from string_col_unvalidated_low     to
string_unvalidated_low
            from string2_col_unvalidated        to string2_unvalidated
            from string2_col_unvalidated_low    to
string2_unvalidated_low
            from command_unvalidated            to dropped
            from command_unvalidated_low        to dropped
            from command_input                  to dropped
            from command_input_low              to dropped
            from command2_unvalidated           to dropped
            from command2_unvalidated_low       to dropped
            from result_unvalidated             to dropped
            from result_unvalidated_low         to dropped
            from result_input                   to dropped
            from result_input_low               to dropped
            from result2_unvalidated            to dropped
            from result2_unvalidated_low        to dropped;
        transition on Execute
            from command_ok                     to result_ok
            from string_unvalidated             to $error with
ESCAPE_COMMAND
            from string_unvalidated_low         to $error with
ESCAPE_COMMAND_LOW
            from string_input                   to $error with
ESCAPE_MISSING_SAL
            from string_input_low               to $error with
ESCAPE_MISSING_SAL_LOW
            from string2_unvalidated            to $error with
ESCAPE_COMMAND2
            from string2_unvalidated_low        to $error with
ESCAPE_COMMAND2_LOW
            from command_unvalidated            to $error with
```

| | |
|---|---|
| ESCAPE_COMMAND | |
|     from command_unvalidated_low | to $error with |
| ESCAPE_COMMAND_LOW | |
|     from command_input | to $error with |
| ESCAPE_MISSING_SAL | |
|     from command_input_low | to $error with |
| ESCAPE_MISSING_SAL_LOW | |
|     from command2_unvalidated | to $error with |
| ESCAPE_COMMAND2 | |
|     from command2_unvalidated_low | to $error with |
| ESCAPE_COMMAND2_LOW; | |
|   transition on Open | |
|     from result_unvalidated | to $error with |
| ESCAPE_COMMAND | |
|     from result_unvalidated_low | to $error with |
| ESCAPE_COMMAND_LOW | |
|     from result_input | to $error with |
| ESCAPE_MISSING_SAL | |
|     from result_input_low | to $error with |
| ESCAPE_MISSING_SAL_LOW | |
|     from result2_unvalidated | to $error with |
| ESCAPE_COMMAND2 | |
|     from result2_unvalidated_low | to $error with |
| ESCAPE_COMMAND2_LOW; | |
|   transition on Precondition | |
|     from string_unvalidated | to $error with |
| ESCAPE_COMMAND | |
|     from string_unvalidated_low | to $error with |
| ESCAPE_COMMAND_LOW | |
|     from string_input | to $error with |
| ESCAPE_MISSING_SAL | |
|     from string_input_low | to $error with |
| ESCAPE_MISSING_SAL_LOW | |
|     from string2_unvalidated | to $error with |
| ESCAPE_COMMAND2 | |
|     from string2_unvalidated_low | to $error with |
| ESCAPE_COMMAND2_Low; | |
| }; | |

In some embodiments, the following code (from a file known as "tsql2.txt) is used in a data analyzer implementation:

```

# Detects improperly escaped input that are used in a SQL
query.

string ESCAPE_COMMAND_INPUT "Unescaped procedure input
executed, making '$error.function.name' vulnerable to first-
order SqlInjection attacks. Please use QUOTENAME to escape
and delimit the input.\n\n Special case: If the input is
actually a SQL command from a trusted source, please
annotate with __sql_command or __sql_command_fragment
depending on whether it's an entire command or a fragment of
one.\n\n";
string ESCAPE_COMMAND_RESULT "Unescaped database result
executed, making '$error.function.name' vulnerable to
second-order SqlInjection attacks. Please use QUOTENAME to
escape and delimit the result.";
string ESCAPE_COMMAND_SAL_INPUT "Unescaped procedure
input passed to procedure expecting escaped input, making
'$error.function.name' vulnerable to indirect first-order
SqlInjection attacks. Please use QUOTENAME to escape and
delimit the input.\n\n Special case: If the input is
actually a SQL command from a trusted source, please
annotate with __sql_command or __sql_command_fragment
depending on whether it's a an entire command or a fragment
of one.\n\n";
string ESCAPE_COMMAND_SAL_RESULT "Unescaped database
result passed to procedure expecting escaped input, making
'$error.function.name' vulnerable to indirect second-order
SqlInjection attacks. Please use QUOTENAME to escape and
delimit the result.";
string ESCAPE_COMMAND "{Code:80100}"
ESCAPE_COMMAND_INPUT;
string ESCAPE_COMMAND2 "{Code:80103}"
ESCAPE_COMMAND_RESULT;
string ESCAPE_COMMAND_SAL "{Code:80104}"
ESCAPE_COMMAND_SAL_INPUT;
string ESCAPE_COMMAND_SAL2 "{Code:80105}"
ESCAPE_COMMAND_SAL_RESULT;
predicate IsString(tracking) is tracking:{SYMBOL} and
   tracking:TYPE:TO:KIND:'CHAR';
predicate IsResultSet(data) is data:{DOT {SYMBOL
   "__TSQL_lastresult"} "ROWS"};
predicate IsEscapeChar(str) is str:{STRING /(\[|\]|'|")/} or
   str:{CONVERT_INTERPRET {STRING /(\[|\]|'|")/}};
predicate IsEscapeCharDef(str) is IsEscapeChar(str) or
   (str:DEFINITION:tmp and IsEscapeChar(tmp));
pattern UntrustedInput after {ENTRY ARGUMENT:tracking} and
   (not PRECONDITION:{A_SQLESCAPED $1})
                       and (not
   PRECONDITION:{A_SQLTRUSTED $1}) and (not
   PRECONDITION:{A_SQLCOMMAND $1})
                       and IsString(tracking) and
   $1=tracking;
pattern UntrustedResult after {EXPRESSION {ASSIGN tracking
   rhs}} and IsString(tracking)
                       and SUBCHILD(rhs, data) and
   IsResultSet(data);
pattern UntrustedAnnotation after {CALL
   POSTCONDITION:{A_SQLUNTRUSTED tracking}};
pattern Concatenate after {EXPRESSION {ASSIGN lhs rhs}} and
```

-continued

```
SUBCHILD(rhs, tracking) and IsString(tracking);
pattern PassThru after {CALL
/__TSQL_(.TRIM|LOWER|UPPER|SUBSTRING|LEFT|RIGHT|
REPLICATE|REVERSE)/ tracking RETURNS:lhs}
            or {CALL "__TSQL_STUFF"
ARGUMENT4:tracking RETURNS:lhs}
            or ({CALL "__TSQL_REPLACE" tracking
data
RETURNS:lhs} and not IsEscapeCharDef(data));
pattern ExecCall after {CALL /__TSQL_(EXEC|sp_executesql)/
tracking};
pattern TrustedCall after {CALL PRECONDITION:{A_SQLTRUSTED
tracking}} or {CALL PRECONDITION:{A_SQLESCAPED tracking}}
or {CALL PRECONDITION:{A_SQLCOMMAND tracking}};
statemachine UnqoutedSql
{
    state untrusted_input;
    state untrusted_result;
    event Source patterns UntrustedInput(tracking)
UntrustedAnnotation(tracking) creation;
    event Result patterns UntrustedResult(tracking)
creation;
    event Transfer patterns Concatenate(tracking, lhs)
PassThru(tracking, lhs) $chain $identity;
    event Sink patterns ExecCall(tracking);
    event IndirectSink patterns TrustedCall(tracking);
    transition $start to untrusted_input on Source;
    transition $start to untrusted_result on Result;
    transition untrusted_input to $error on Sink with
ESCAPE_COMMAND;
    transition untrusted_result to $error on Sink with
ESCAPE_COMMAND2;
    transition untrusted_input to $error on IndirectSink
with ESCAPE_COMMAND_SAL;
    transition untrusted_result to $error on IndirectSink
with ESCAPE_COMMAND_SAL2;
};
```

In some embodiments, the embedded annotation language and/or data analyzer technology is used to find defects in a language other than ASP, e.g., in TSQL. Language-specific aspects would be apparent to someone familiar with the programming languages being analyzed, such as the fact that certain TSQL built-in functions like RTRIM do not affect whether something is validated or not. Additional information on TSQL has been published at msdn dot Microsoft dot com/en-us/library/bb510741.aspx.

In some situations, the dataflow analyzer also issues warnings in the absence of annotations, such as when the whole problem is contained within a single function (for ASP, this is not uncommon). Annotation statements (excl. suppressions) are needed in some embodiments if a function boundary is crossed or if other external information is needed (such as preconditions on a single function program).

Some embodiments associate a suppress-warning-unvalidated-SQL-executed statement with a SQL statement specified in the program source code. The suppress-warning-unvalidated-SQL-executed statement indicates that the dataflow analyzer is to suppress any warning of an unvalidated input usage by the SQL statement. In some cases, the "warning suppress" statements merely suppress given warnings on the subsequent line. In addition to warning suppress, some embodiments have warning enable/warning disable aspects to suppress blocks (multiple lines) of code.

Some embodiments associate a validate-parameter statement with a validation routine specified in the program source code, the validate-parameter statement specifying a parameter of the validation routine for indicating that the dataflow analyzer is to suppress any warning of an unvalidated user input within the parameter on any code path which receives the parameter via the routine. The dataflow analyzer understands that from that point onwards, the string parameter is validated and hence acceptable to include in a SQL query (not issuing a warning in the fist place).

In some embodiments, the attach mechanism is not limited to COM controls, but can be used for any function—including ones that we do have the definition for. Sometimes, code has multiple owners and one owner does not want to modify code owned by someone else.

For attach, suppress may not be optimal, because it works on the textually subsequent line—we have the attach/detach parts so that you can disable waning in attach (beginning of function) and re-enable them in detach (end of function). For example, assume we have

```
// @embed __suppress_XX
DoXX( );
DoXX( );
```

Then only the first occurrence of DoXX is suppressed and a warning at the second one is issued. However, if we have:

```
// @embed __disable_XX
DoXX( );
DoXX( );
// @embed __enable_XX
DoXX( );
```

Then the two first occurrences are suppressed. For this:

```
// @embed __suppress_XX
DoXX( ); DoXX( );
```

Both are suppressed (since _suppress_XX works on the whole subsequent line, no matter how many statements are there. For this:

```
// @embed __disable_XX
DoXX( );
DoXX( );   /* @embed __enable_XX */
DoXX( );
```

We suppress only the first two again, because enable/disable are understood to apply at their precise point in the text. For C/C++ macros for example, that can be only one line, it means that we can use suppression in such situations.

The attach/detach places the attach statements at the entry position of the function definition and the detach as the exit position (like closing }). For suppression it means that we can use _disable_XX in attach and _enable_XX in detach to suppress all occurrences of DoXX in the attached function and have it work no matter how the function is textually laid out.

In some embodiments, once the API is annotated, the tool will generate warnings for all entry points into this function from user controlled data. For each call to the COM routine, the warning is issued at the callsite if the parameter passed has not previously been validated. That is, once the API is annotated, the tool will generate warnings for all calls to this function with user-controlled, unvalidated data. Some embodiments locate an attach-COM-routine-validation statement within the program source code, and produce a SQL injection vulnerability warning message at an entry point into a COM routine that is specified in the attach-COM-routine-validation statement.

As illustrated by the discussion of @@embed _suppress_warning_unvalidated_sql_executed; some embodiments associate a suppress-warning-unvalidated-SQL-executed statement with a SQL statement specified in the program source code. The suppress-warning-unvalidated-SQL-executed statement indicates that the dataflow analyzer is to suppress any warning of an unvalidated input usage by the SQL statement.

As illustrated by the discussion of @@embed _sql_validate(paramname); some embodiments associate a validate-parameter statement with a validation routine specified in the program source code. The validate-parameter statement specifies a parameter of the validation routine for indicating that the dataflow analyzer is to suppress any warning of an unvalidated user input within the parameter on any code path which receives the parameter via the routine.

As illustrated by the discussion of

```
@@embed attach __VBS_EXECSQL(this, x) {
__sql_pre_validated(x) }
``` some embodiments associate an attach-COM-routine-validation statement with the program source code. The attach-COM-routine-validation statement specifies a COM routine defined in a COM control and also specifies at least one sub-statement for indicating that the dataflow analyzer is to associate the sub-statement(s) with each invocation of the COM routine. The sub-statement(s) may include, for example, a prevalidated-parameter statement, a suppress-warning-unvalidated-SQL-executed statement, and/or a validate-parameter statement.

In some embodiments, if every function is fully annotated then the embodiment can provide a scalable, modular global analysis. Full annotation means that if the function expects a validated string parameter then _sql_pre_validated is on the parameter, for example. More generally, full annotation means that every validated string is only used locally or is only passed as argument to an annotated function parameter. In other words, no validated string is passed or stored somewhere non-local not annotated as validated.

Figure 5:
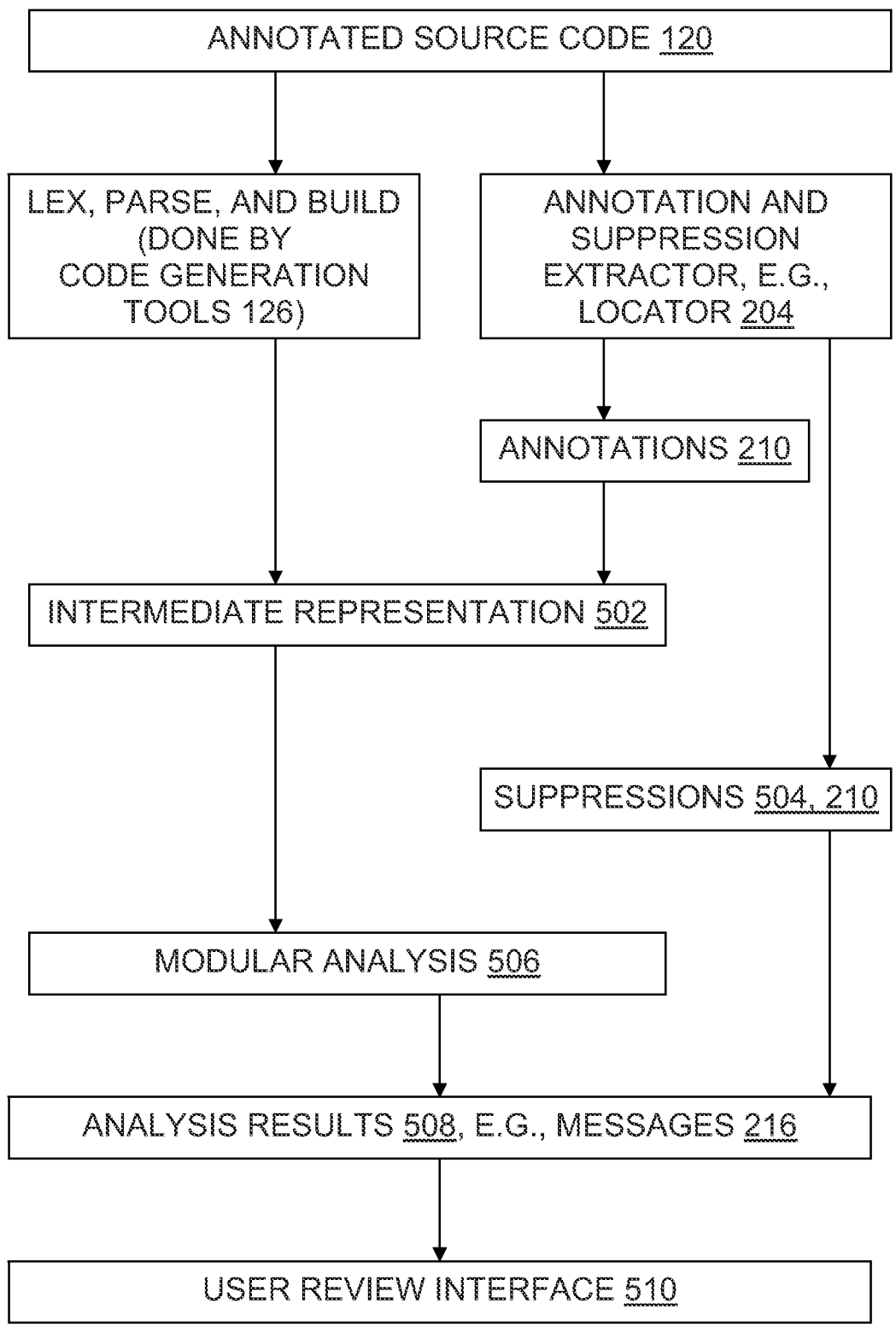
FIG. 5 is a data flow diagram illustrating data flow from annotated source code through dataflow analysis to user review, in some embodiments.

FIG. 5 is a data flow diagram illustrating data flow from annotated source code through dataflow analysis to user review, in some embodiments. Source code 120 with embedded annotation statements 210 undergoes lexical analysis to create tokens, which are then parsed, and used to build an intermediate representation 502, such as abstract syntax trees, during code generation by a compiler, for example. This part of the data flow disregards, and is not impacted by, the annotations because they are embedded in non-code-generative portions of the source code and hence ignored by the compiler.

However, the annotated source code also undergoes processing by an annotation and suppression extractor, such as a dataflow embedded annotation statement locator 204, with results in non-suppressive annotations 210 and suppressions 504 (another form of annotation 210) being extracted. The intermediate representation 502 of the program, such as virtual machine code, is built based on both the normal code generation and the embedded annotations. Some embodiments use more than one intermediate representation 502. One intermediate representation is used for analysis, which analysis tools may define and modify (an "analysis IR"). For guarded statements, in particular, it is sometimes convenient to have an IR to modify as opposed to, say, piggybacking on a fixed compiler intermediate representation. One intermediate representation is also used for each compiler/interpreter consuming the language; such intermediate representations are not affected by the embedded statements.

The intermediate representation 502 undergoes a modular analysis 506. "Modular" here means "function by function in isolation", so that the complexity of analysis is linear in the number of functions. Results 508 of the modular analysis, minus the suppressed warnings, are provided as vulnerability warning messages 216 displayed to the user in an interface 510, e.g., on a display or in a file.

In some embodiments, annotations also introduce assumptions. A precondition annotation on a function parameter of a function foo is validated by the program analyzer to hold when analyzing a caller of foo, and is assumed by the program analyzer to hold when analyzing foo. A postcondition annotation on a function parameter of a function foo is validated by the program analyzer to hold when analyzing foo, and is assumed by the program analyzer to hold after a call to foo when analyzing a caller of foo. Some embodiments include an embedded annotation statement interpreter configured for interpreting the annotation statement and assuming a condition specified with the annotation as known to be true. Some include an embedded annotation statement interpreter configured for interpreting the annotation statement and using that information in the analysis, such as reporting whether the program source code violates a condition specified with the annotation. That is, annotations can be used to communicate hints/assumptions to a dataflow analyzer or other program analyzer.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIGS. 3 and 4 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer system for global correctness checking, the system comprising:
    a logical processor;
    a memory in operable communication with the logical processor; and
    a program analyzer residing in the memory, the program analyzer having:
        an embedded annotation statement locator configured for locating a modular annotation statement that is embedded in a non-code-generative portion of a program source code, the program source code written in a first programming language recognized by a code generation tool for code generation, the annotation statement written in a second programming language which is unrecognized by the first programming language's code generation tool, the second programming language including syntax for numeric operators, syntax for expressions which contain at least one numeric operator, syntax for logical operators, and syntax for expressions which contain at least one logical operator; and
        an embedded annotation statement interpreter configured for interpreting the annotation statement and reporting whether the program source code is globally correct or instead violates a condition specified with the embedded modular annotation.

2. The system of claim 1, wherein the program analyzer comprises a dataflow analyzer.

3. The system of claim 1, wherein the system further comprises the program source code, wherein the program source code resides in the memory, and wherein multiple annotation statements in the second programming language are embedded in at least one non-code-generative portion of the program source code.

4. The system of claim 3, wherein the program source code is configured to execute statements in at least one of the following languages: SQL, TSQL.

5. The system of claim 3, wherein the embedded annotation statements include at least two of the following statements:
    a define-NAME-as-expression statement;
    an include-filename statement;
    an if-statement;
    a block-statement;
    a procedure-NAME statement;
    a NAME statement;
    an attach-NAME statement;
    a suppression statement.

6. The system of claim 3, wherein the embedded annotation statements include at least one of the following macro statements:
    a SQL-prevalidated-parameter macro;
    a SQL-validate-parameter macro;
    a suppress-warning-unvalidated-SQL-executed macro;
    a SQL-attach-function-annotation macro.

7. The system of claim 1, wherein the non-code-generative portion of the program source code is located in a comment in the first programming language, the comment recognizable by the code generation tool as a comment.

8. A method for analyzing global correctness of a program source code, the method comprising the steps of:
    embedding modular annotation statements in at least one non-code-generative portion of the program source code, the program source code written in a first programming language recognized by a code generation tool for code generation, the annotation statements written in a second programming language which is unrecognized by the first programming language's code generation tool, the second programming language including syntax for numeric operators, syntax for expressions which contain at least one numeric operator, syntax for logical operator, and syntax for expressions which contain at least one logical operator; and
    submitting the annotated program source code to a dataflow analyzer; and
    receiving from the dataflow analyzer a verification which reports whether the program source code is globally correct or instead violates one or more conditions specified with the embedded modular annotation statements.

9. The method of claim 8, wherein the embedding step comprises embedding annotation statements in a non-code-generative portion of program source code which is configured to receive TSQL statements.

10. The method of claim 8, wherein the step of embedding annotation statements comprises associating a prevalidated-parameter statement with a routine specified in the program source code, the prevalidated-parameter statement specifying a parameter of the routine for indicating to the dataflow analyzer that the parameter has been prevalidated as containing validated user input.

11. The method of claim 8, wherein the step of embedding annotation statements comprises associating a suppress-warning-unvalidated-SQL-executed statement with a SQL statement specified in the program source code, the suppress-warning-unvalidated-SQL-executed statement for indicating that the dataflow analyzer is to suppress any warning of an unvalidated input usage by the SQL statement.

12. The method of claim 8, wherein the step of embedding annotation statements comprises associating a validate-parameter statement with a validation routine specified in the program source code, the validate-parameter statement specifying a parameter of the validation routine for indicating that the dataflow analyzer is to suppress any warning of an unvalidated user input within the parameter on any code path which receives the parameter via the routine.

13. The method of claim 8, wherein the step of embedding annotation statements comprises associating an attach-COM-routine-validation statement with the program source code, the attach-COM-routine-validation statement specifying a COM routine defined in a COM control and also specifying at least one sub-statement for indicating that the dataflow analyzer is to associate the sub-statement(s) with each invocation of the COM routine, the sub-statement(s) including at least one of the following: a prevalidated-parameter statement, a suppress-warning-unvalidated-SQL-executed statement, a validate-parameter statement.

14. The method of claim 8, wherein each routine of the program source code is annotated, and the method further comprises receiving from the dataflow analyzer injection vulnerability warning messages which collectively provide a scalable modular global analysis of the program source code.

15. A computer-readable storage medium configured with data and with instructions that when executed by at least one processor causes the processor(s) to perform a method for globally analyzing correctness of a program source code with respect to SQL injection vulnerabilites, the method comprising the steps of:
   receiving a program source code which is written in a first programming language recognized by a code generation tool for code generation;
   locating modular annotation statements embedded in at least one-code-generative portion of the programming source code, the annotation statements written in a second programming language which is unrecognized by the first programming language's code generation tool, the second programming language including syntax for numeric operators, syntax for expressions which contain at least one numeric operator, syntax for logical operators, and syntax for expression which contain at least one logical operator; and
   producing injection vulnerability warning messages based on dataflow analysis of the modular annotation statements and the correctness of the program source code for SQL injection.

16. The configured storage medium of claim 15, wherein the method produces at least one of the following injection vulnerability warning messages:
   possible injection vulnerability through data that is read from an object without any detected input validation by the program source code;
   possible injection vulnerability through data that is read from an object after passing through at least one routine of the program source code that might perform input validation;
   possible injection vulnerability through data that is read from a server without any detected input validation by the program source code;
   possible injection vulnerability through data that is read from a server after passing through at least one routine of the program source code that might perform input validation;
   possible injection vulnerability in routine parameter data that has no detected input validation by the program source code;
   possible injection vulnerability in routine parameter data that passes through at least one routine of the program source code that might perform input validation.

17. The configured storage medium of claim 15, wherein the method locates an attach-COM-routine-validation statement within the program source code, and the method produces an injection vulnerability warning message at an entry point into a COM routine that is specified in the attach-COM-routine-validation statement.

18. The configured storage medium of claim 15, wherein each routine of the program source code is annotated, and the method produces injection vulnerability warning messages which collectively provide a scalable modular global analysis of the program source code.

19. The configured storage medium of claim 15, wherein the non-code-generative portion of the program source code is located in a comment in the first programming language, the comment recognizable by the code generation tool as a comment.

20. The configured storage medium of claim 15, wherein the program source code comprises at least one statement by which Transact-SQL extends SQL.

* * * * *